(12) United States Patent
Jeong

(10) Patent No.: US 12,206,359 B2
(45) Date of Patent: Jan. 21, 2025

(54) METHOD AND SYSTEM FOR SOLAR PHOTOVOLTAIC POWER STATION MONITORING

(71) Applicant: MGIT, Gimhae-si (KR)

(72) Inventor: Woo Chul Jeong, Changwon-si (KR)

(73) Assignee: MGIT, Gimhae-si (KR)

( * ) Notice: Subject to any disclaimer, the term of this patent is extended or adjusted under 35 U.S.C. 154(b) by 969 days.

(21) Appl. No.: 17/108,826

(22) Filed: Dec. 1, 2020

(65) Prior Publication Data

US 2022/0077820 A1 Mar. 10, 2022

Related U.S. Application Data

(63) Continuation of application No. PCT/KR2020/017263, filed on Nov. 30, 2020.

(30) Foreign Application Priority Data

Sep. 4, 2020 (KR) .................. 10-2020-0113061

(51) Int. Cl.
| | | |
|---|---|---|
| *G06V 20/17* | (2022.01) | |
| *B64U 10/00* | (2023.01) | |
| *G06T 5/80* | (2024.01) | |
| *H02S 50/00* | (2014.01) | |
| *H02S 50/15* | (2014.01) | |
| *B64U 101/30* | (2023.01) | |
| *G06T 3/02* | (2024.01) | |

(52) U.S. Cl.
CPC .............. *H02S 50/15* (2014.12); *B64U 10/00* (2023.01); *G06T 5/80* (2024.01); *G06V 20/17* (2022.01); *H02S 50/00* (2013.01); *B64U 2101/30* (2023.01); *B64U 2201/10* (2023.01); *G06T 3/02* (2024.01)

(58) Field of Classification Search
None
See application file for complete search history.

(56) References Cited

FOREIGN PATENT DOCUMENTS

| CN | 107464214 A | * 12/2017 | ........... G06T 3/4038 |
|---|---|---|---|
| CN | 110942457 A | * 3/2020 | |
| JP | 2016186682 A | 10/2016 | |

(Continued)

OTHER PUBLICATIONS

Xie et al., "A robust projection plane selection strategy for UAV image stitching," International Journal of Remote Sensing, 40:8, pp. 3118-3138 (Year: 2019).*

(Continued)

*Primary Examiner* — Vincent Rudolph
*Assistant Examiner* — Nicholas Crespo Stazer
(74) *Attorney, Agent, or Firm* — STIP Law Group, LLC

(57) ABSTRACT

Disclosed are a method and a system for solar photovoltaic power station and the system includes: an unmanned aerial vehicle flying over the sky of a plurality of solar photovoltaic panels included in a solar photovoltaic power station and obtaining and providing a monitoring image by photographing the solar photovoltaic panel; and a computing device correcting the monitoring image and obtaining the corrected monitoring image, and executing a solar photovoltaic power station monitoring application of performing a malfunction area inspection process for the solar photovoltaic panel based on the obtained corrected monitoring image.

6 Claims, 15 Drawing Sheets

(56) References Cited

FOREIGN PATENT DOCUMENTS

| | | | |
|---|---|---|---|
| JP | 2019052954 | A | 4/2019 |
| KR | 101541032 | B1 | 8/2015 |
| KR | 101779040 | B1 | 9/2017 |
| KR | 101943342 | B1 | 1/2019 |
| KR | 101967638 | B1 | 4/2019 |
| KR | 20190036589 | A * | 4/2019 |
| KR | 102023470 | B1 | 9/2019 |

OTHER PUBLICATIONS

Henry et al., "Automatic Detection System of Deteriorated PV Modules Using Drone with Thermal Camera," Appl. Sci. 10(11), 3802 (Year: 2020).*

Dongho Lee and Jonghwa Park, Development of Solar-Panel Monitoring Method Using Unmanned Aerial Vehicle and Thermal Infrared Sensor, IOP Conf. Series: Materials Science and Engineering, 2019, vol. 611, Issue 012085, IOP Publishing, Bristol, United Kingdom.

* cited by examiner

[FIG. 1]
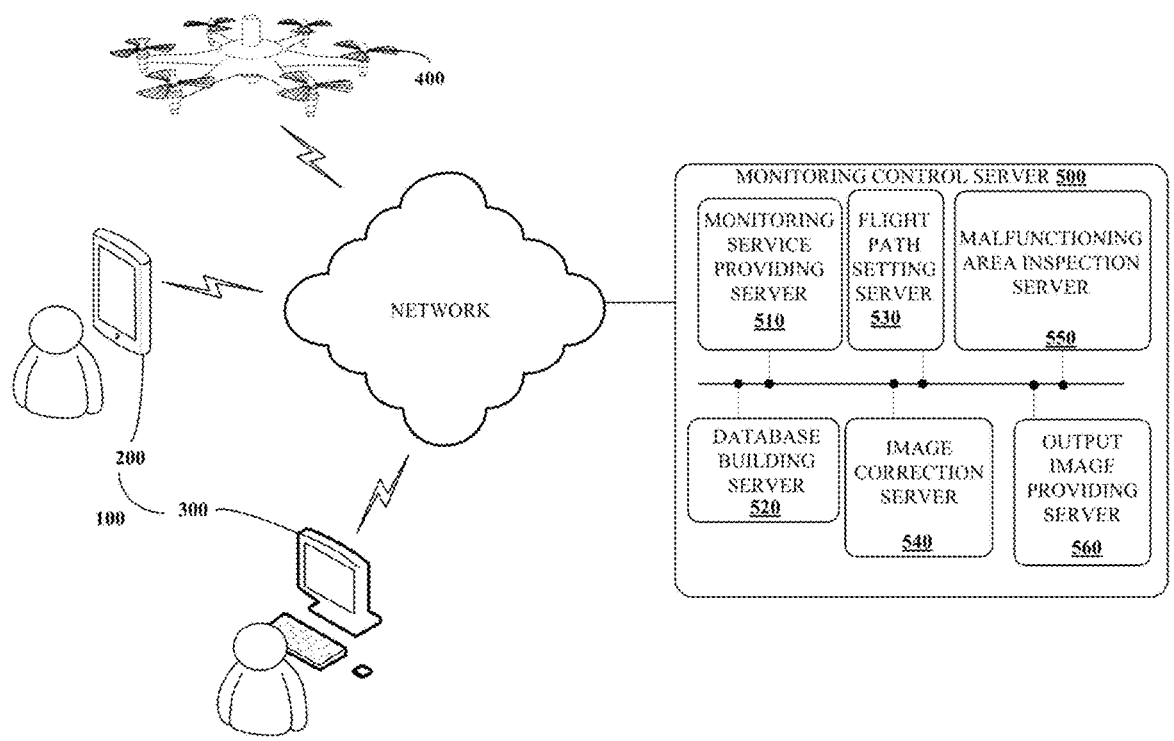

[FIG. 2]
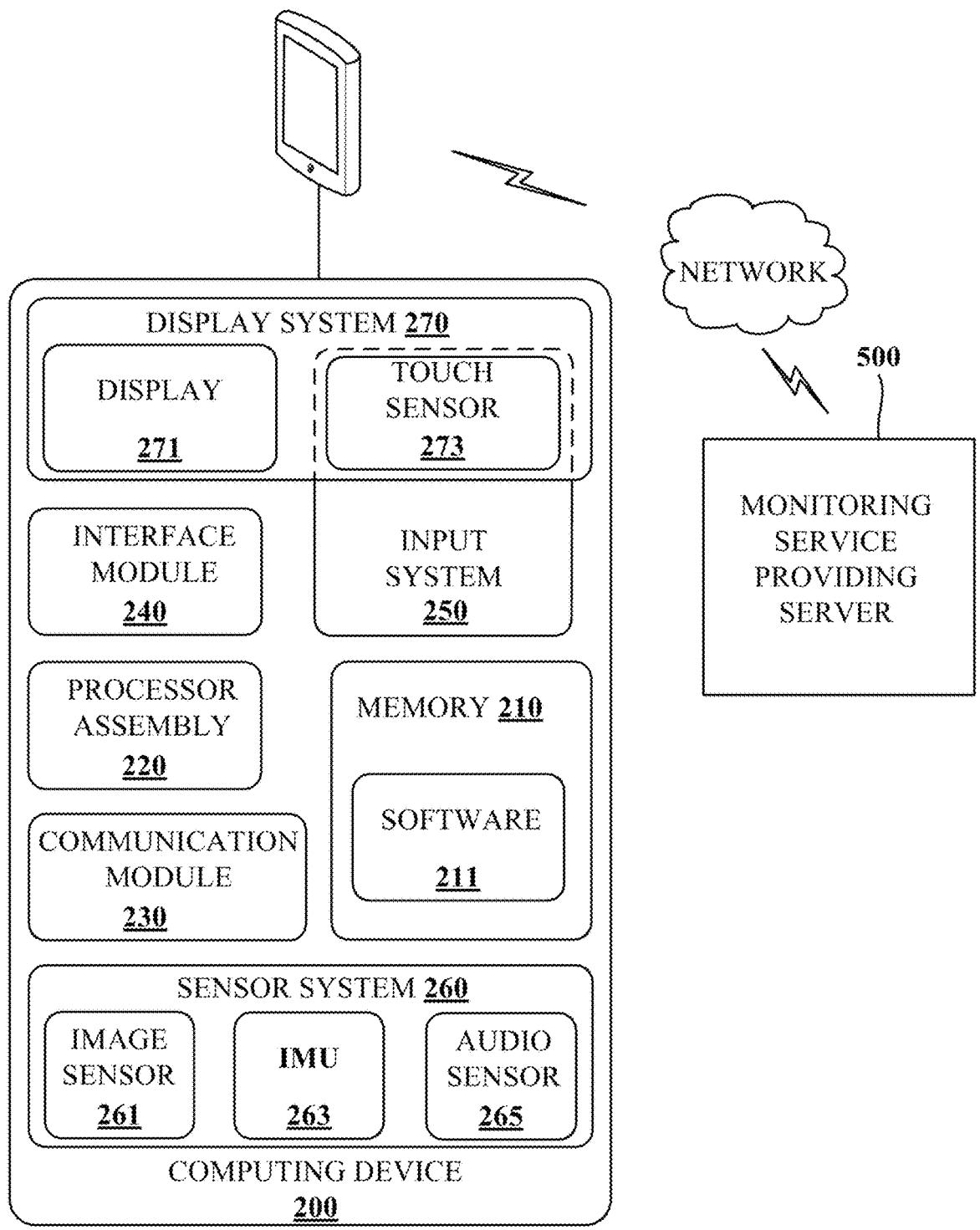

[FIG. 3]
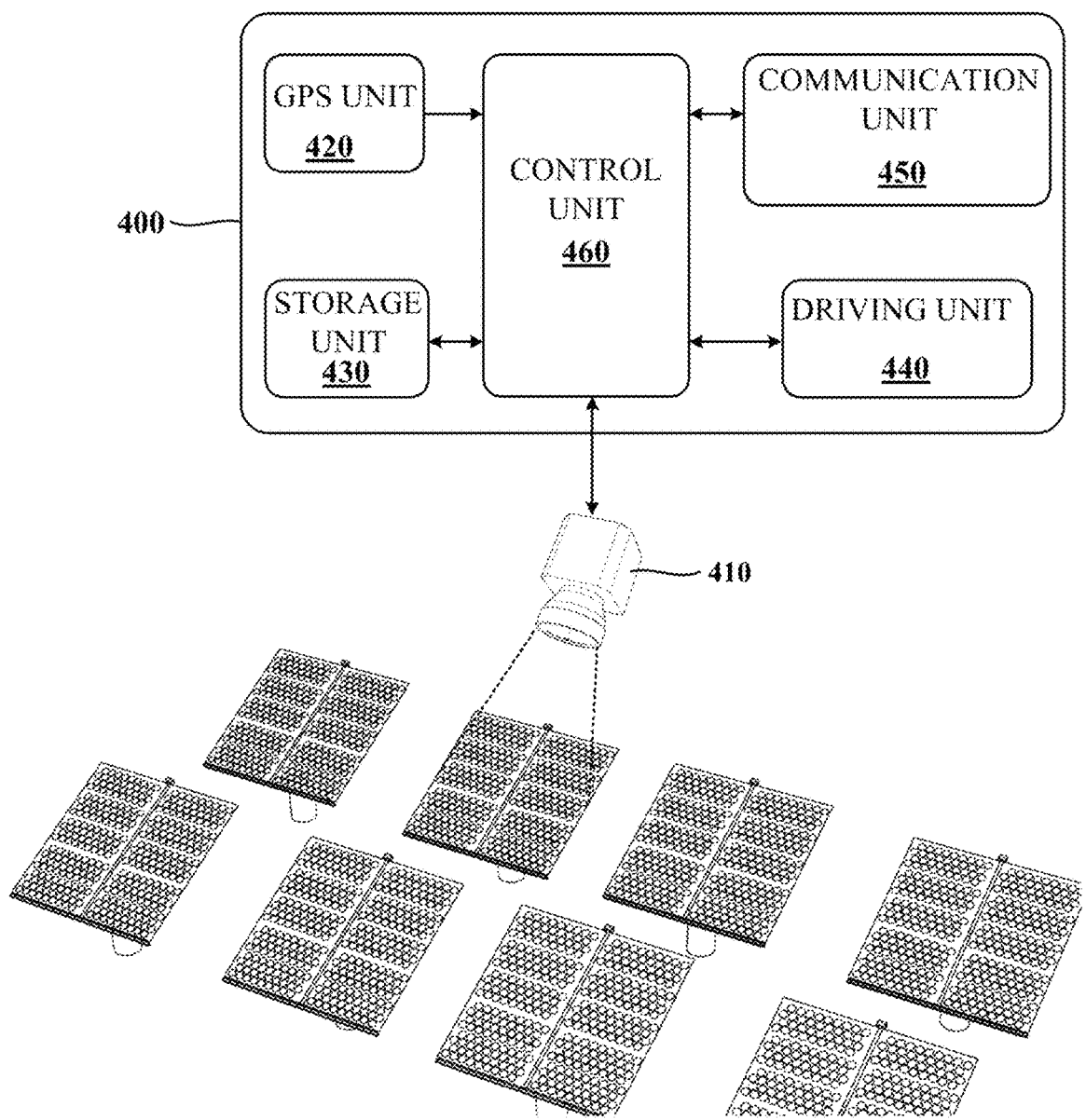

[FIG. 4]
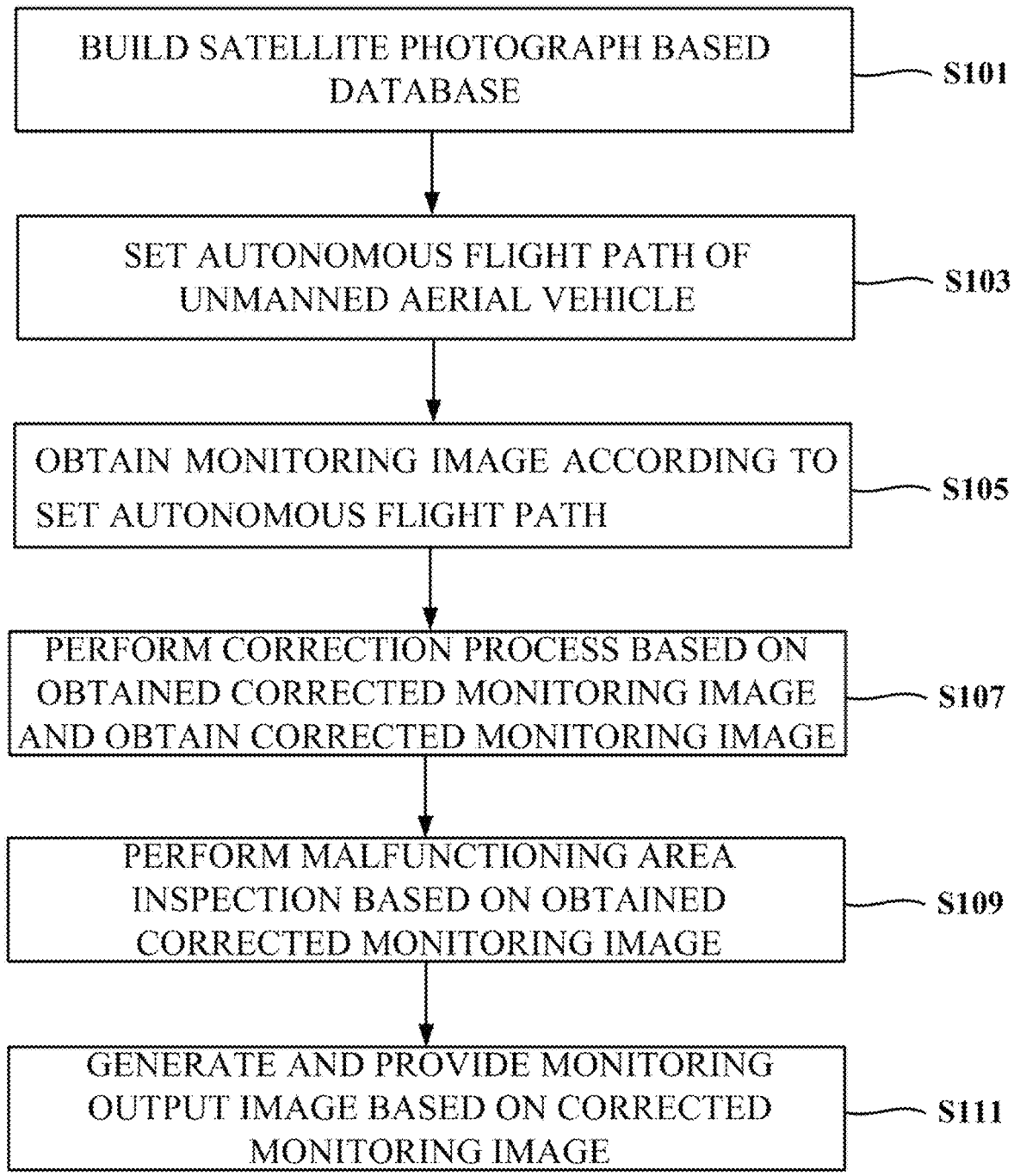

[FIG. 5]
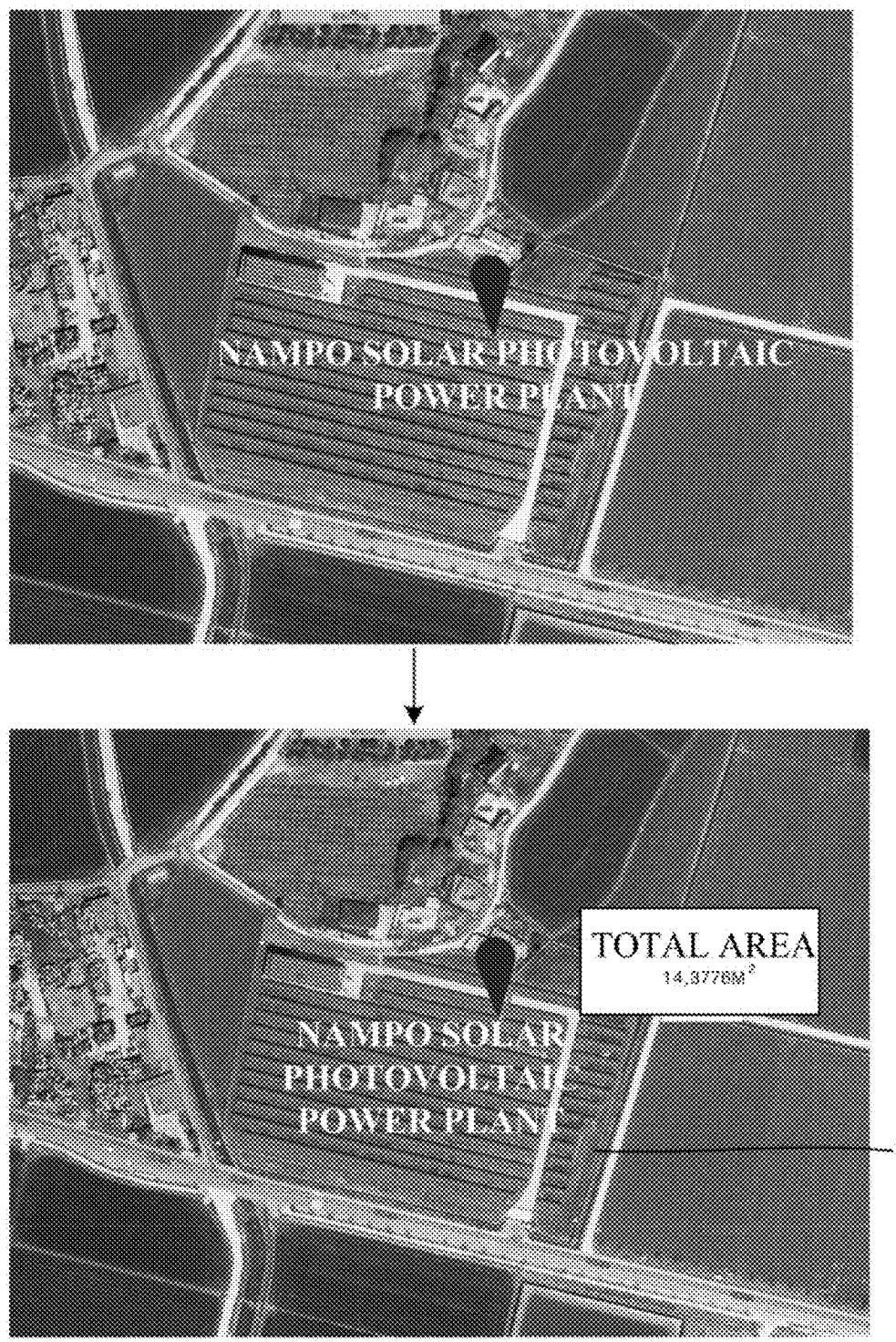

[FIG. 6]
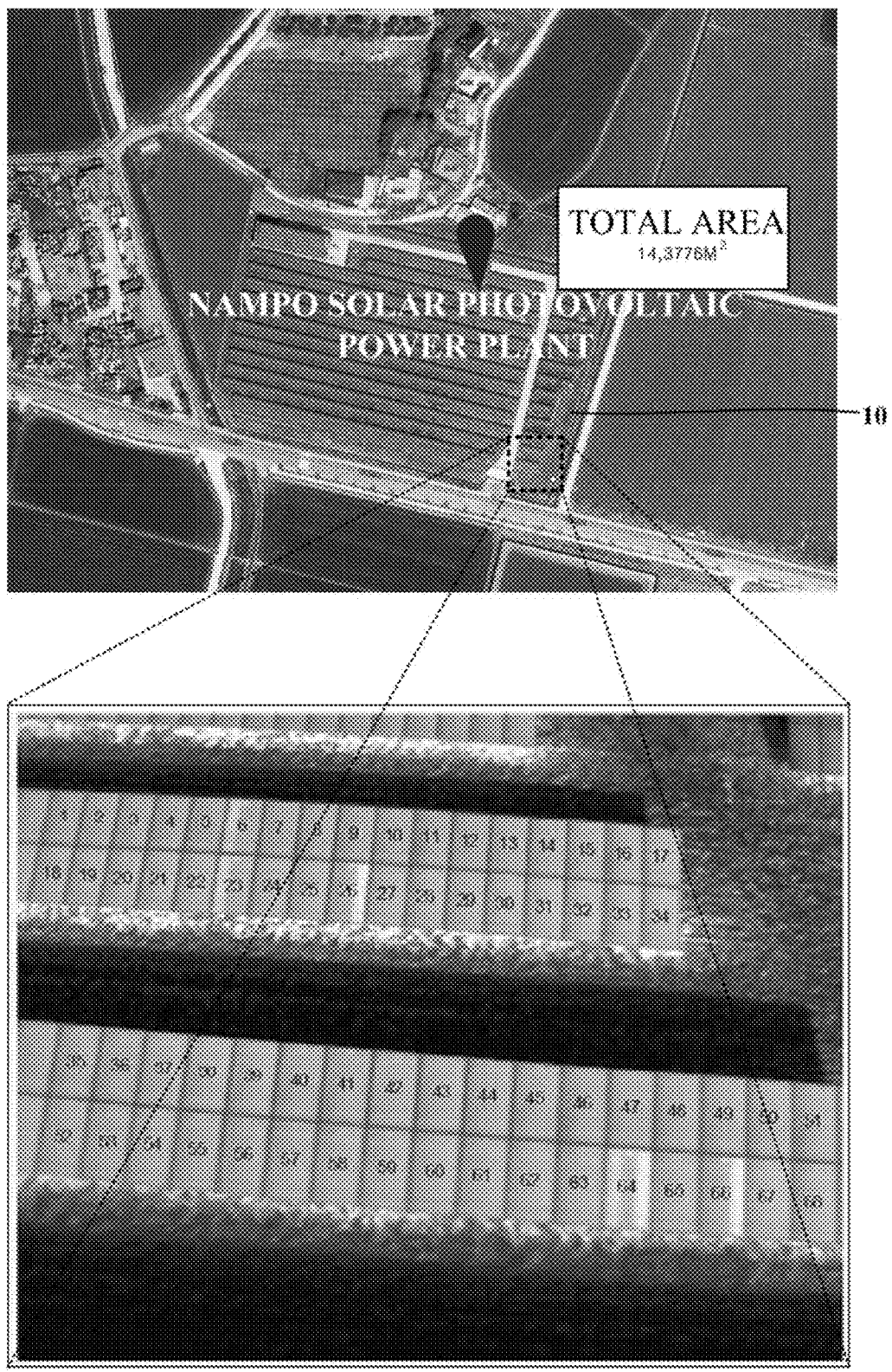

[FIG. 7]
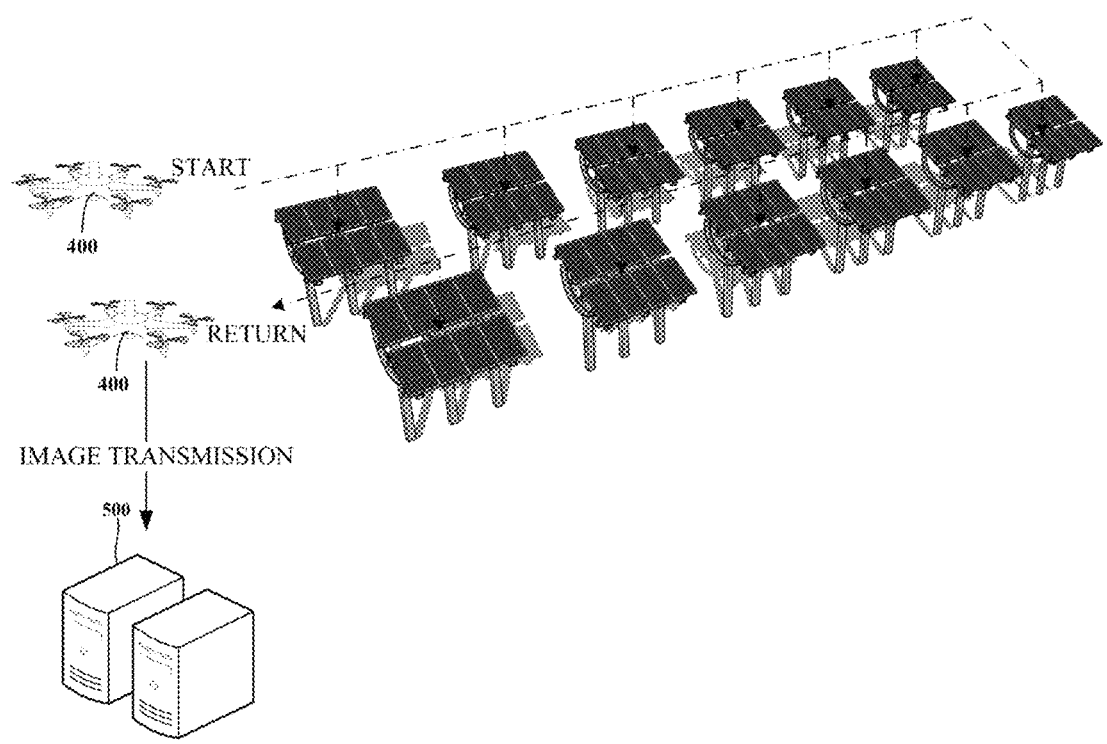
[FIG. 8(a)]
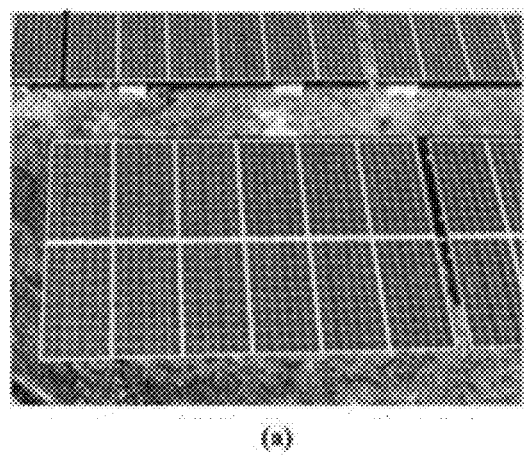
(a)

[Fig. 8(b)]
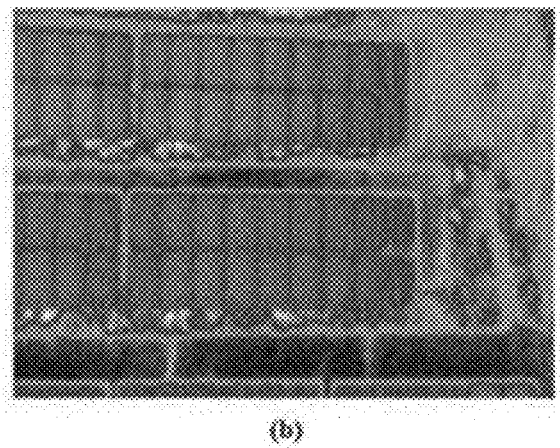
(b)
[FIG. 8(c-1)]
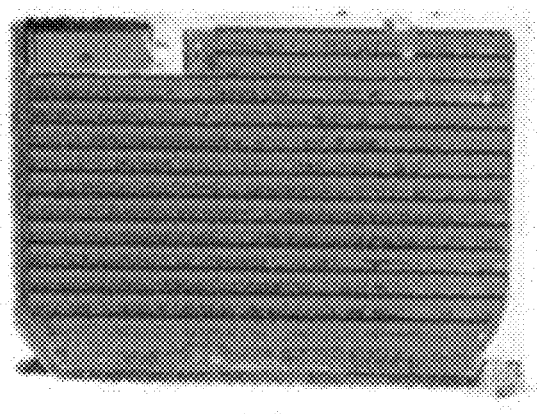
(c-1)
[FIG. 8(c-2)]
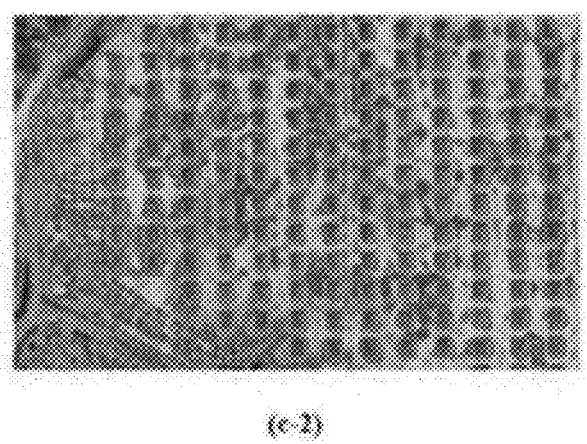
(c-2)

[Fig. 9 (a)]
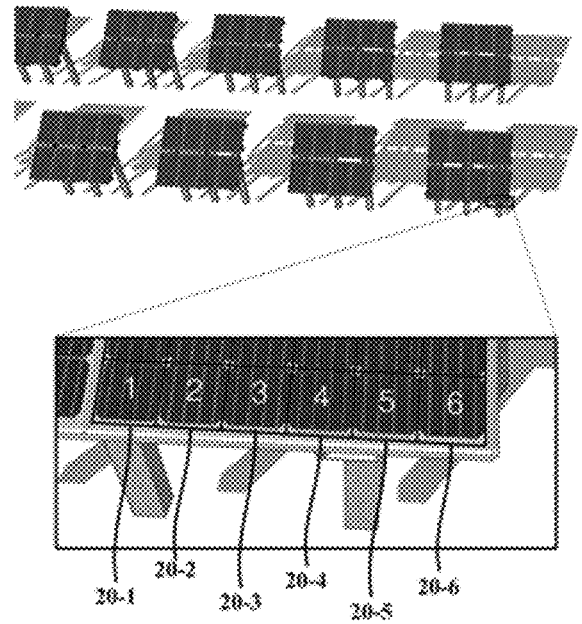
(a)
[FIG. 9(b)]
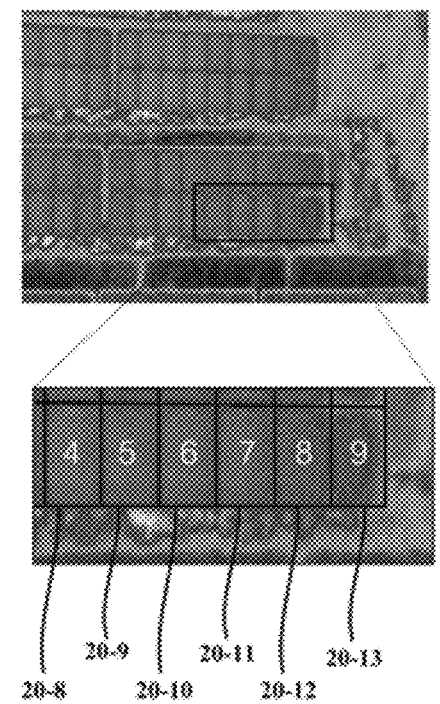
(b)

[FIG. 10]
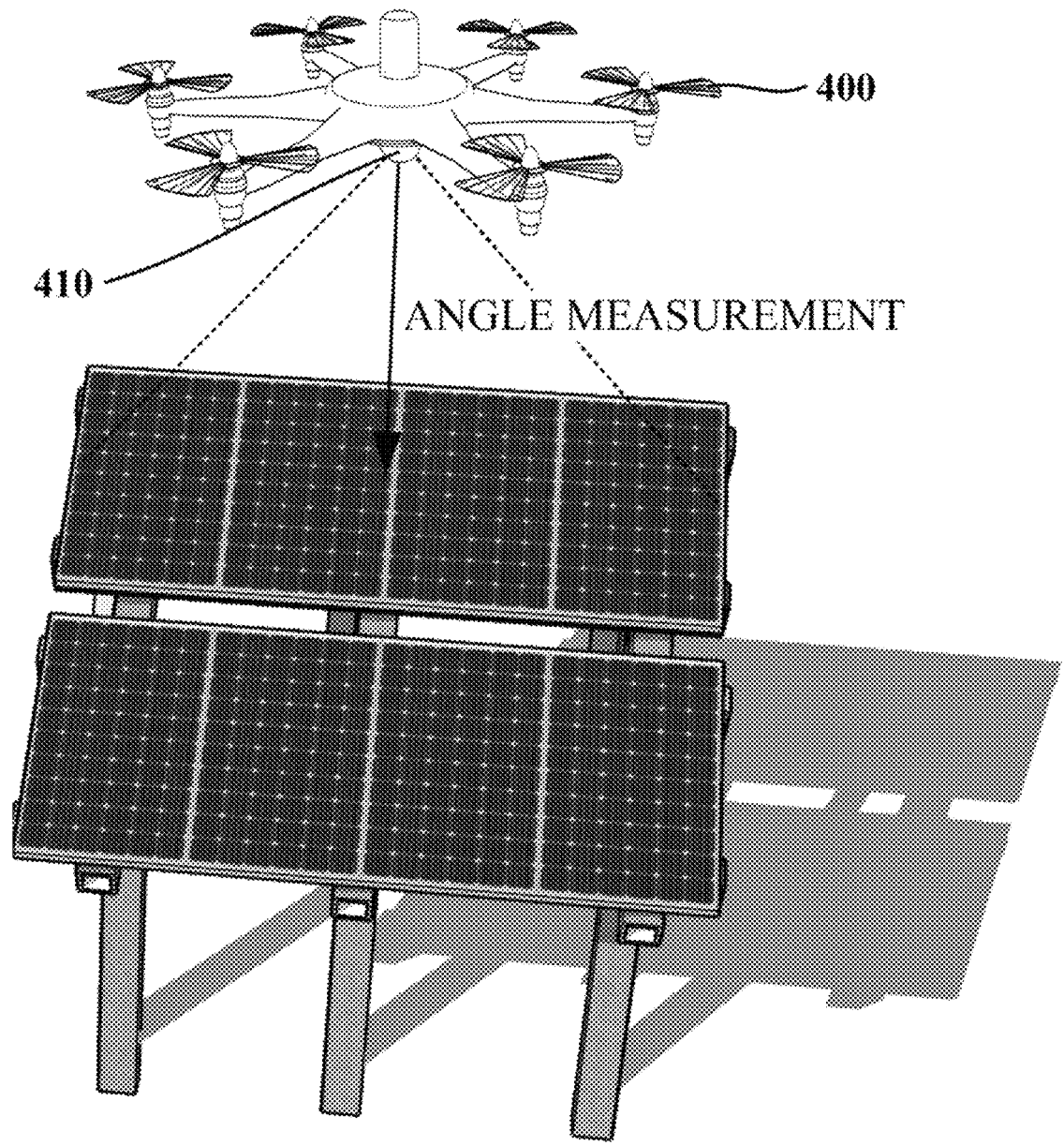

[FIG. 11]
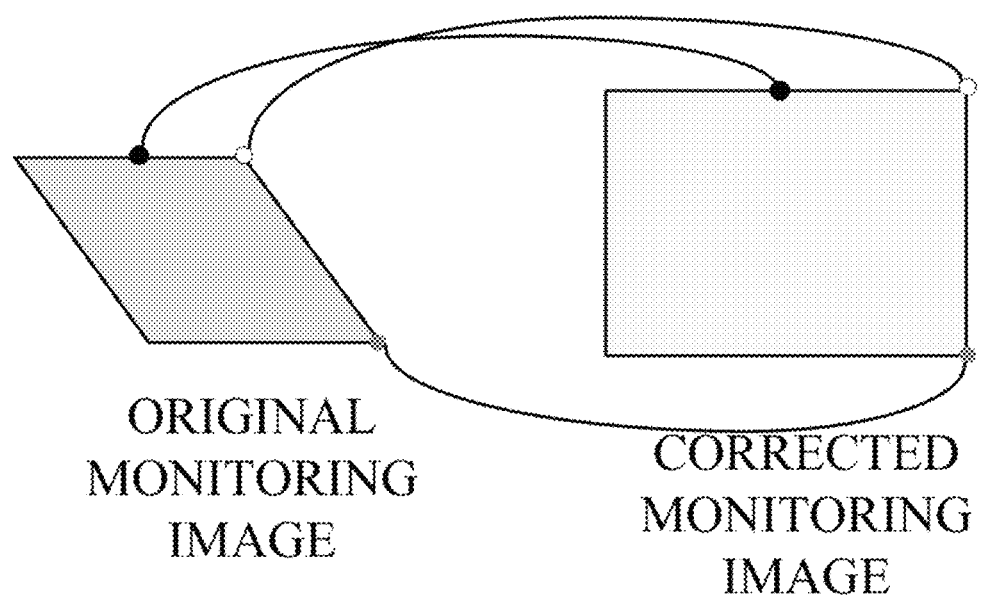
ORIGINAL MONITORING IMAGE
CORRECTED MONITORING IMAGE
[FIG. 12]
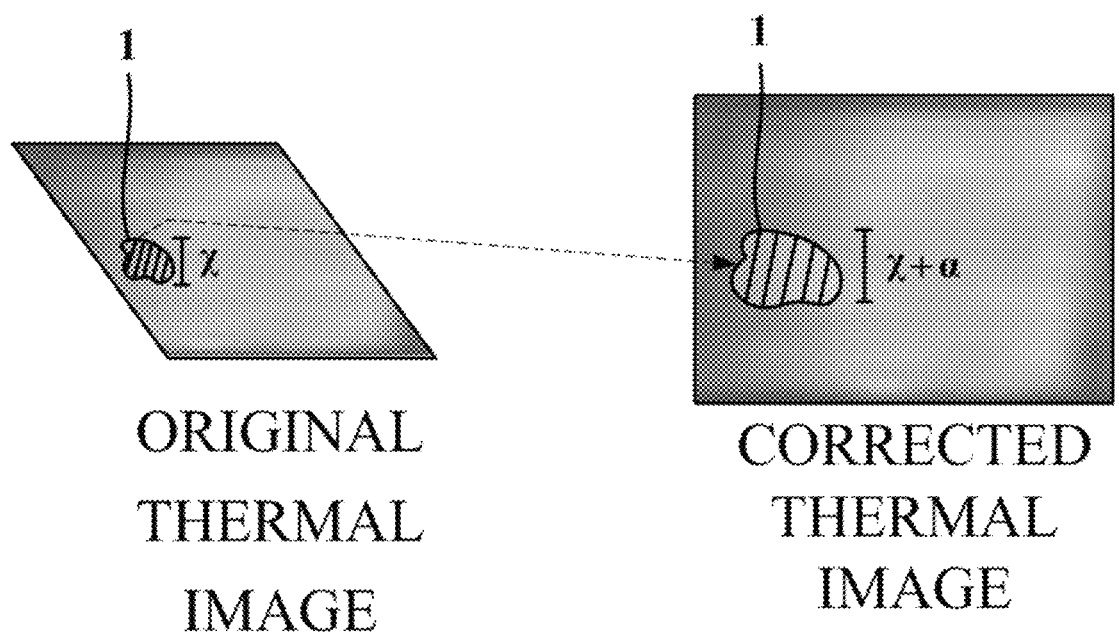
ORIGINAL THERMAL IMAGE
CORRECTED THERMAL IMAGE

[FIG. 13]
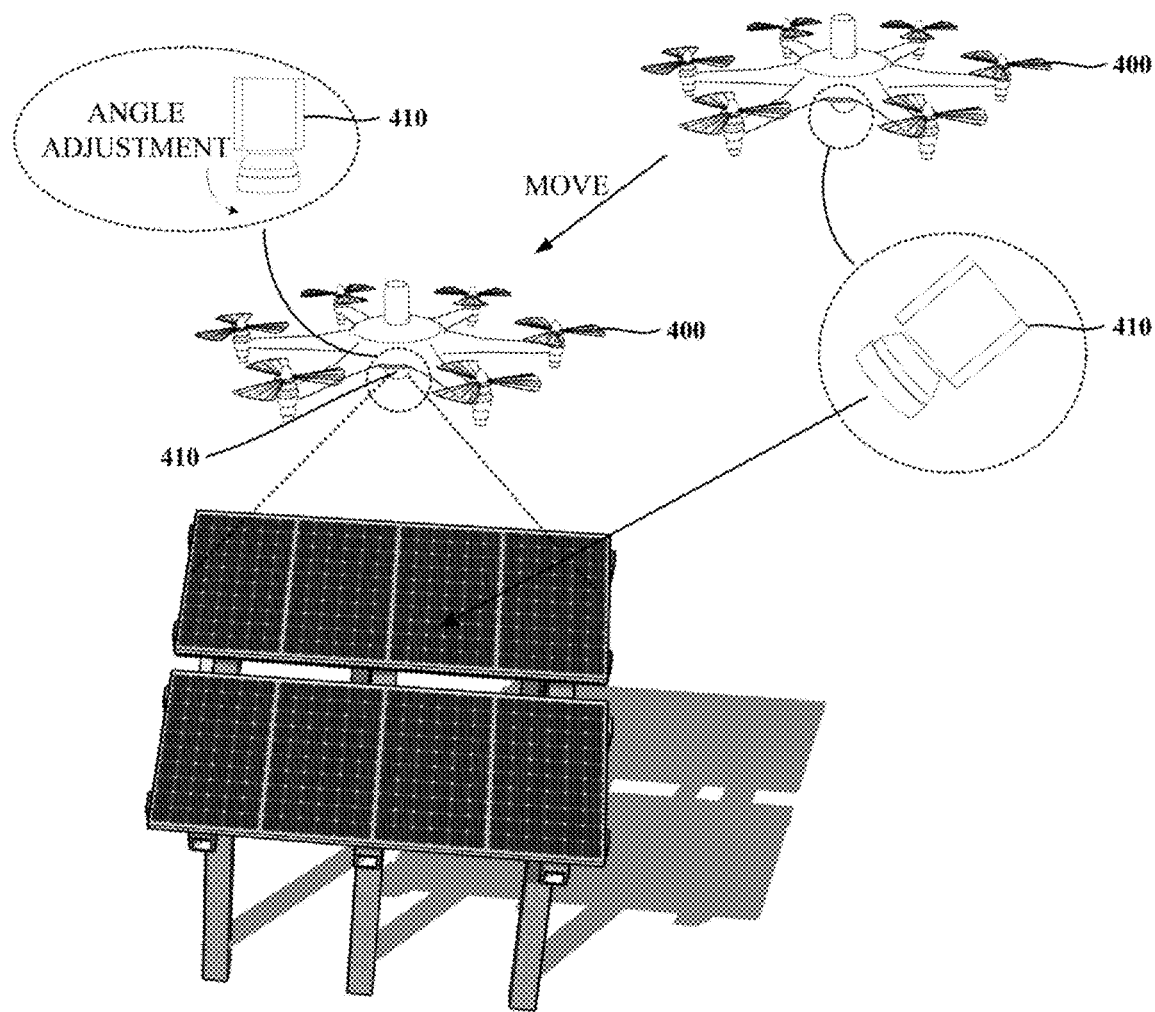

[FIG. 14]
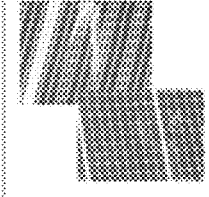

[FIG. 15]
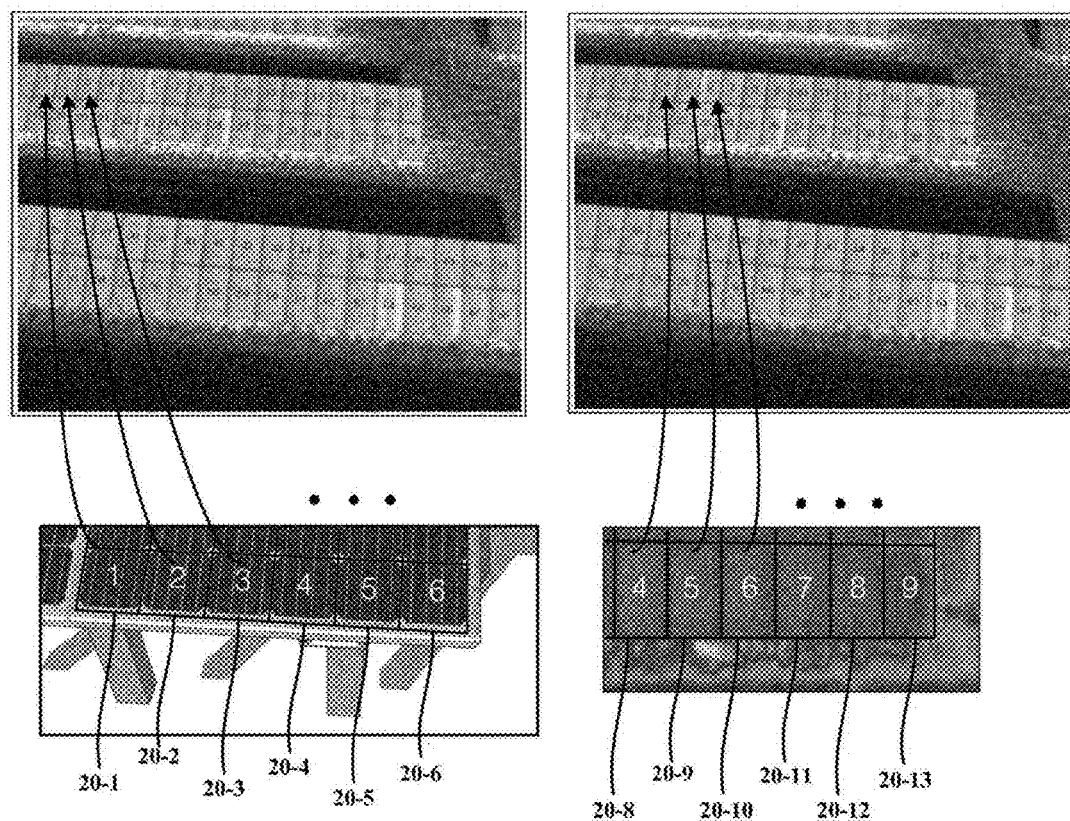

[FIG. 16]
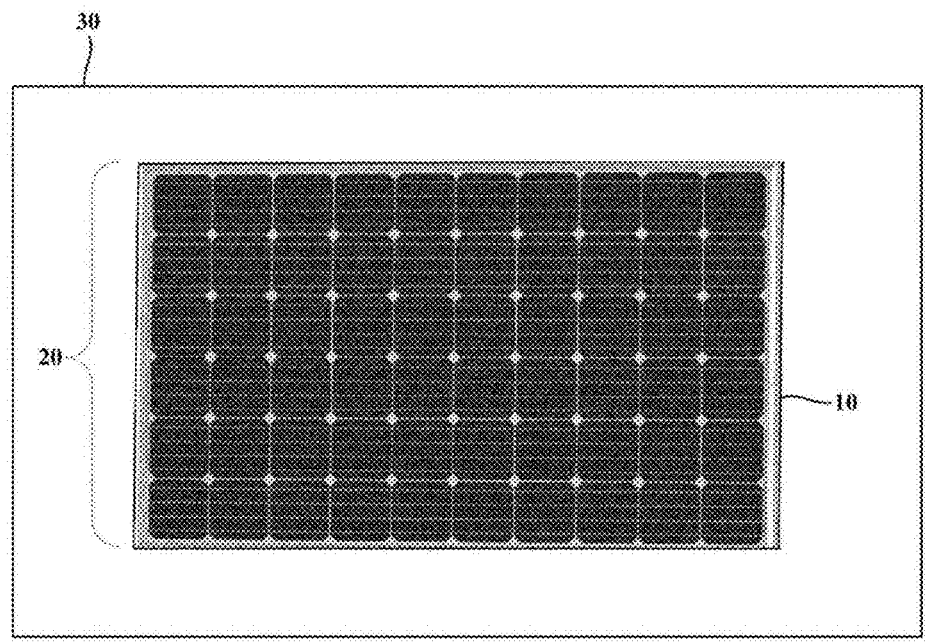
[FIG. 17]
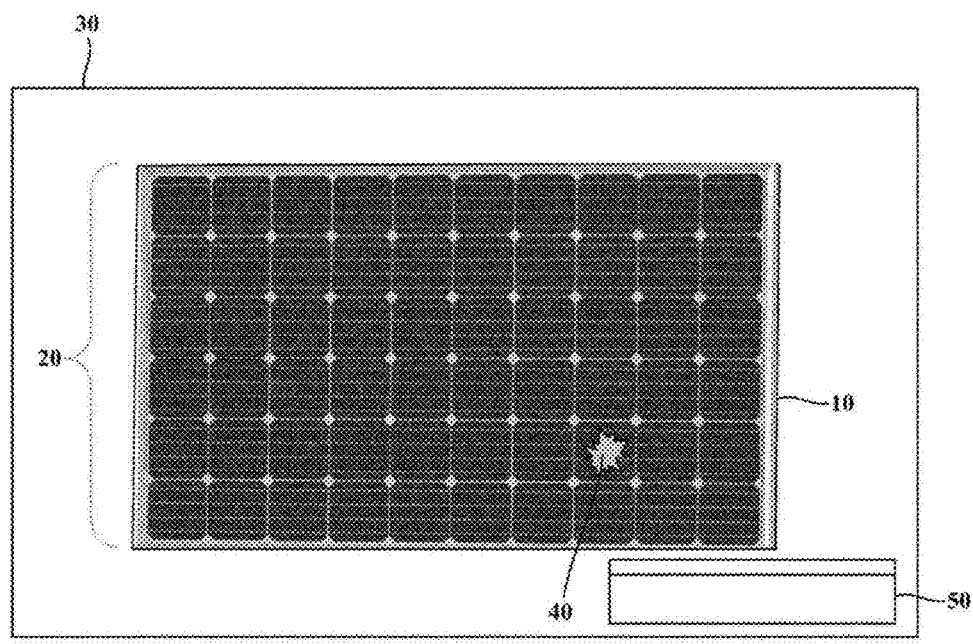

METHOD AND SYSTEM FOR SOLAR PHOTOVOLTAIC POWER STATION MONITORING

CROSS-REFERENCE TO RELATED APPLICATIONS

This application is a continuation of Application No. PCT/KR2020/017263 filed Nov. 30, 2020, which in turn claims the benefit of Korean Patent Application No. 10-2020-0113061 filed on Sep. 4, 2019, the disclosures of which are incorporated by reference into the present application.

BACKGROUND OF THE DISCLOSURE

Field of the Disclosure

The present disclosure relates to a method and a system for monitoring a solar photovoltaic power station. This achievement is a research conducted with the support of Gyeongnam Techno Park's 2020 Gimhae ICT Convergence Industry Ecosystem Construction Support Project.

Related Art

A solar photovoltaic power generation system is in the spotlight as one of the renewable energy, but since a panel for collecting solar photovoltaic energy is operated by being exposed to a natural environment, a short circuit occurs due to corrosion of a module, or a cell is shielded from dust or dirt, reducing power generation efficiency.

In general, a defective cell exhibits a higher temperature than surrounding normal cells by releasing thermal energy. Therefore, when a thermal imaging camera is used, defects can be effectively detected even during operation of a solar photovoltaic power plant.

In the conventional solar power plant inspection, a technique of visually inspecting a malfunctioning panel with the naked eye using the thermal imaging camera using a hand-held thermal infrared sensor using the technical features is widely used.

However, when this method is applied to the inspection of a large-scale solar photovoltaic power plant, a lot of time and cost are required.

Thus, in recent years, a technology for monitoring the solar photovoltaic power plant by mounting the thermal imaging camera on an unmanned aerial vehicle (UAV) has been developed.

However, the technologies developed so far are at the level of detecting the malfunctioning panel or a malfunction area by visually reading an image captured in the air, so there is a disadvantage of timing consuming to analyze a large amount of images. In addition, in the related art, there is a limitation in that a technology for minimizing errors that may occur in inspecting the malfunctioning panel or the malfunction area is insufficient according to an angle at which a camera mounted on a drone photographs a solar photovoltaic panel.

SUMMARY OF THE DISCLOSURE

The present disclosure provides a method and a system for solar photovoltaic power station, which correct an image obtained from an unmanned aerial vehicle that photographs a solar photovoltaic power station, and determines and provide a malfunctioning area which occurs on the corresponding solar photovoltaic power station base on the corrected image.

In an aspect, provided are a method and a system for solar photovoltaic power station and the system includes: an unmanned aerial vehicle flying over the sky of a plurality of solar photovoltaic panels included in a solar photovoltaic power station and obtaining and providing a monitoring image by photographing the solar photovoltaic panel; and a computing device correcting the monitoring image and obtaining the corrected monitoring image, and executing a solar photovoltaic power station monitoring application of performing a malfunction area inspection process for the solar photovoltaic panel based on the obtained corrected monitoring image.

BRIEF DESCRIPTION OF THE DRAWINGS

FIG. 1 is a conceptual view of a system for solar photovoltaic power station according to an embodiment of the present disclosure.

FIG. 2 is an internal block diagram of a mobile type computing device according to the embodiment of the present disclosure.

FIG. 3 is a configuration diagram for describing an unmanned aerial vehicle according to the embodiment of the present disclosure.

FIG. 4 is a flowchart for describing a method for solar photovoltaic power station according to an embodiment of the present disclosure.

FIG. 5 illustrates an example of a diagram for describing a method for building a database based on a satellite photograph according to an embodiment of the present disclosure.

FIG. 6 illustrates an example of a diagram for describing a method for mapping an identification code for each individual panel in the satellite photograph according to an embodiment of the present disclosure.

FIG. 7 illustrates an example of a diagram for describing a method for setting an autonomous flight path of an unmanned aerial vehicle according to an embodiment of the present disclosure.

FIG. 8(a), FIG. 8(b), FIG. 8(c-1) and FIG. 8(c-2) illustrates examples of a diagram for describing a monitoring image according to an embodiment of the present disclosure.

FIG. 9(a) and FIG. 9(b) illustrates examples of a diagram for describing a panel image according to an embodiment of the present disclosure.

FIG. 10 illustrates an example of a case of calculating a photographing angle of the unmanned aerial vehicle according to an exemplary embodiment of the present disclosure.

FIG. 11 illustrates an example of a case of performing image processing for a panel image when the panel image has a predetermined photographing angle error according to an embodiment of the present disclosure.

FIG. 12 illustrates an example of a case of performing a color correction process for a panel image of a thermal image according to an embodiment of the present disclosure.

FIG. 13 illustrates an example of a case of correcting a photographing angle of the unmanned aerial vehicle based on a monitoring image according to an embodiment of the present disclosure.

FIG. 14 illustrates an example of a diagram for describing a malfunctioning area inspecting process according to another embodiment of the present disclosure.

FIG. 15 illustrates an example of a diagram for describing a method for generating a monitoring result image based on a corrected monitoring image according to an embodiment of the present disclosure.

FIG. 16 is a conceptual view for describing the monitoring result image according to an embodiment of the present disclosure.

FIG. 17 illustrates an example of a case providing malfunctioning area inspecting result information based on the monitoring result image.

DESCRIPTION OF EXEMPLARY EMBODIMENTS

The present disclosure may have various modifications and various embodiments and specific embodiments will be illustrated in the drawings and described in detail in the detailed description.

FIG. 1 is a conceptual view of a system for solar photovoltaic power station according to an embodiment of the present disclosure.

Referring to FIG. 1, the system for solar photovoltaic power station according to an embodiment of the present disclosure may include a computing device 100, an unmanned aerial vehicle 400, and a monitoring control server 500.

In an embodiment, the computing device 100, the unmanned aerial vehicle 400, and the monitoring control server 500 may provide a solar photovoltaic power station monitoring service which corrects an image obtained from the unmanned aerial vehicle 400 that photographs a solar photovoltaic power station (i.e., in the embodiment, a solar photovoltaic power plant) in conjunction with each other, and determines and provides a malfunctioning area which occurs on the corresponding solar photovoltaic power station based on the corrected image.

In detail, in an embodiment, the solar photovoltaic power station monitoring system (hereinafter, referred to as a monitoring system) may build a database required for the solar photovoltaic power station monitoring service based on a satellite image which is an image photographed by an artificial satellite.

In addition, in an embodiment, the monitoring system may set an autonomous flight path (hereinafter, referred to as a flight path) of the unmanned aerial vehicle 400 for photographing the solar photovoltaic power station.

In addition, the monitoring system may obtain a photographed image (in an embodiment, a monitoring image) according to the set flight path.

Further, in an embodiment, the monitoring system performs a process of correcting the obtained monitoring image to obtain a corrected monitoring image for which predetermined image processing is performed.

In addition, the monitoring system according to an embodiment may perform a malfunctioning area inspection for the solar photovoltaic power station based on the corrected monitoring image obtained as above.

Further, in an embodiment, the monitoring system may generate and provide a monitoring result image which is monitoring result information provided in the solar photovoltaic power station monitoring service based on the corrected monitoring image.

Meanwhile, the computing device 100, the unmanned aerial vehicle 400, and the monitoring control server 500 may be connected through a network.

Here, the network refers to a connection structure in which information may be exchanged between nodes such as the computing device 100, the unmanned aerial vehicle 400, and the monitoring control server 500, and an example of such a network may include various wired/wireless networks including a 3rd Generation Partnership Project (3GPP) network, a Long Term Evolution (LTE) network, a World Interoperability for Microwave Access (WIMAX) network, Internet, a Local Area Network (LAN), Wireless Local Area Network (LAN), a Wide Area Network (WAN), a Personal Area Network (PAN), a Bluetooth network, a satellite broadcasting network, an analog broadcasting network, a Digital Multimedia Broadcasting (DMB) network, etc., but is not limited thereto.

Computing Device 100

In an embodiment of the present disclosure, the computing device 100 may execute a solar photovoltaic power station monitoring application (hereinafter, referred to as a monitoring application) which corrects an image obtained from the unmanned aerial vehicle 400 that photographs a solar photovoltaic power station (i.e., in the embodiment, a solar photovoltaic power plant), and determines and provides a malfunctioning area which occurs on the corresponding solar photovoltaic power station based on the corrected image.

In an embodiment, the computing device 100 may include various types of computing devices 100 (e.g., mobile type or desktop type) on which the monitoring application is installed.

1. Mobile Type Computing Device 200

In an embodiment of the present disclosure, the mobile type computing device 200 may be a mobile device such as a smart phone or tablet PC on which the monitoring application is installed.

For example, the mobile type computing device 200 may include a smart phone, a mobile phone, a digital broadcasting terminal, personal digital assistants (PDA), a portable multimedia player (PMP), a tablet PC, and the like.

FIG. 2 is an internal block diagram of a mobile type computing device 200 according to the embodiment of the present disclosure.

Referring to FIG. 2, the mobile type computing device 200 according to an exemplary implementation may include a memory 210, a processor assembly 220, a communication module 230, an interface module 240, an input system 250, a sensor system 260, and a display system 270. The components may be configured to be included in the housing of the mobile type computing device 200.

In detail, the monitoring application 211 may be stored in the memory 210, and the monitoring application 211 may store any one or more of various application programs, data, and commands for providing an environment in which the solar photovoltaic power station monitoring service may be implemented.

For example, the memory 210 may include satellite photographs, solar photovoltaic power plant location (address) information, identification code information, aerial photographs (monitoring images), environmental data, reference value information, algorithm information, and/or monitoring result images.

That is, the memory 210 may store instructions and data which may be used to create a solar photovoltaic power station monitoring service environment.

Furthermore, the memory 210 may include at least one non-transitory computer-readable storage medium and a transitory computer-readable storage medium. For example, the memory 210 may be various storage devices including a ROM, a RAM, an EPROM, a flash drive, a hard drive, etc., or may include a web storage that performs a storage function of the memory 210 on the Internet.

The processor assembly 220 may include at least one processor capable of executing instructions of the monitoring application 210 stored in the memory 110 in order to perform various tasks for implementing the solar photovoltaic power station monitoring service environment.

In an embodiment, the processor assembly 220 may control the overall operation of components through the monitoring application 211 of the memory 210 in order to provide the solar photovoltaic power monitoring service.

The processor assembly 220 may include a central processing unit (CPU) and/or a graphic processor unit (GPU). Furthermore, the processor assembly 220 may be implemented to include at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors, and electric units for performing other functions.

The communication module 230 may include one or more devices for communicating with other computing devices (e.g., monitoring control server 500). The communication module 230 may communicate through a wireless network.

In detail, the communication module 230 may communicate with a computing device storing a virtual content source for implementing the solar photovoltaic power station monitoring service, and may communicate with various user input components such as a controller receiving a user input.

In an embodiment, the communication module 230 may transmit/receive various data related to the solar photovoltaic power station monitoring service to/from the monitoring control server 500 and/or other computing devices 100.

The communication module 230 may wirelessly transmit/receive data to/from at least one of a base station, an external terminal, and a random server on a mobile communication network constructed through a communication device that may perform technical standards or communication methods (e.g., Long Term Evolution (LTE), Long Term Evolution-Advanced (LTE-A), 5G New Radio (NR), or WIFI) for mobile communication or a short-range communication method.

The sensor system 260 may include various sensors such as an image sensor 261, a location sensor (IMU) 263, an audio sensor, a distance sensor, a proximity sensor, a contact sensor, and the like.

The image sensor 261 may capture an image and/or a video of a physical space around the mobile type computing device 200.

In an embodiment, the image sensor 261 may photograph and obtain an image (as an embodiment, a solar photovoltaic power plant photographing image, etc.) related to the solar photovoltaic power station monitoring service.

In addition, the image sensor 261 may be arranged on a front surface or/and a rear surface of the mobile type computing device 200 and acquire the image by capturing a direction side at which the image sensor 161 is arranged and capture the physical space such as the work field through a camera arranged toward the outside of the mobile type computing device 200.

The image sensor 261 may include an image sensor device and an image processing module. In detail, the image sensor 261 may process a still image or a moving picture obtained by the image sensor device (e.g., CMOS or CCD).

Further, the image sensor 261 may extract required information by processing the still image or the moving picture obtained through the image sensor device using the image processing module and transfer the extracted information to the processor.

The image sensor 261 may be a camera assembly including at least one camera. The camera assembly may include a general camera for capturing a visible light band and may further include a special camera such as an infrared camera, a stereo camera, etc.

The IMU 263 may detect at least one or more of a motion and an acceleration of the mobile type computing device 200. For example, the IMU 263 may be constituted by a combination of various location sensors such as an accelerometer, a gyroscope, and a magnetometer. Further, the IMU 263 may recognize spatial information for the physical space around the mobile type computing device 200 in link with the location communication module 230 such as the GPS of the communication module 230.

In addition, the IMU 263 may detect information for detecting and tracking a gaze direction and a head motion of the user based on the detected location and direction.

Further, in some implementations, the monitoring application 211 may determine the location and the direction of the user in the physical space by using the IMU 263 and the image sensor 261 or recognize the feature or the object in the physical space.

The audio sensor 265 may recognize a sound around the mobile type computing device 200.

In detail, the audio sensor 265 may include a microphone capable of detecting a voice input of the user of the mobile type computing device 200.

In an embodiment, the audio sensor 265 may receive voice data required for the solar photovoltaic power station monitoring service from the user.

The interface module 240 may connect the mobile type computing device 200 to communicate with one or more other devices. In detail, the interface module 240 may include wired and/or wireless communication devices compatible with one or more different communication protocols.

The mobile type computing device 200 may be connected to various input/output devices through the interface module 240.

For example, the interface module 240 may be connected to an audio output device such as a headset port or a speaker to output audio.

As an example, it has been described that the audio output device is connected through the interface module 240, but an embodiment installed inside the mobile type computing device 200 may also be included.

The interface module 240 may be configured to include at least one of a wireless/wired headset port, an external charger port, a wired/wireless data port, a memory card port, a port connecting a device with an identification module, an audio input/output (I/O) port, a video input/output (I/O) port, an earphone port, a power amplifier, an RF circuit, a transceiver, and other communication circuits.

The input system 250 may detect an input (e.g., gesture, voice command, button operation, or other type of input) related to the solar photovoltaic power station monitoring service.

In detail, the input system 250 may include a button, a touch sensor, and an image sensor 261 that receives a user motion input.

Further, the input system 250 is connected to an external controller through the interface module 240 to receive the input of the user.

The display system 270 may output various information related to the solar photovoltaic power station monitoring service.

The display may include at least one of a liquid crystal display (LCD), a thin film transistor-liquid crystal display (TFT LCD), an organic light-emitting diode (OLED), a flexible display, a 3D display, and an electronic ink (e-ink) display.

The components may be arranged in the housing of the mobile type computing device 200 and a user interface may include a touch sensor 273 on a display 271 configured to receive a touch input of the user.

In detail, the display system 270 may include the display 271 outputting the image and the touch sensor 273 detecting the touch input of the user.

As an example, the display 271 has a mutual layer structure with the touch sensor 273 or is integrally formed to be implemented as a touch screen. Such a touch screen may serve as a user input unit for providing an input interface between the mobile type computing device 200 and the user and provide an output interface between the mobile type computing device 200 and the user.

2. Desktop Type Computing Device 300

Redundant contents in the description of the component of the desktop type computing device 300 will be replaced with a description of the component of the mobile type computing device 200 and hereinafter, the description will be made centering on a difference from the mobile type computing device 200.

In another example, the desktop type computing device 300 may further include devices in which a program for executing the solar photovoltaic power station monitoring service based on wired/wireless communication, such as personal computers is installed, which include a fixed desktop PC, a laptop computer, and an ultrabook in which the monitoring application is installed.

Further, the desktop type computing device 300 includes a user interface system to receive a user input (e.g., a touch input, a mouse input, a keyboard input, a gesture input, a motion input using a guide tool, etc.).

As an example, in the desktop type computing device 300, the user interface system is connected to at least one device of a mouse, a keyboard, a gesture input controller, an image sensor (e.g., a camera), and an audio sensor by various communication protocols to acquire the user input.

In addition, the desktop type computing device 300 may be connected to an external output device through the user interface system, and may be connected to, for example, a display device, or an audio output device.

Further, the desktop type computing device 300 according to an exemplary implementation may include a memory, a processor assembly, a communication module, a user interface system, and an input system. The components may be configured to be included in the housing of the desktop type computing device 300.

Redundant contents in the description of the component of the desktop type computing device 300 will be replaced with the description of the component of the mobile type computing device 200.

However, in an embodiment of the present disclosure, components illustrated in FIG. 2 are not required in implementing the computing device 100 and the computing device 100 described in the present disclosure may thus have components more or less than components listed above.

Further, according to an embodiment of the present disclosure, various embodiments are available in that some of various functional operations described above, which are performed in the computing device 100 may be performed in the unmanned aerial vehicle 400 and/or the monitoring control server 500.

Unmanned Aerial Vehicle (UAV) 400

In an embodiment of the present disclosure, the unmanned aerial vehicle 400 may be implemented as an unmanned aerial vehicle (e.g., a drone, etc.), and flies over the sky of an area where a plurality of solar photvoltaic panels constituting the solar photovoltaic power station are located and includes a camera unit to obtain a monitoring image for the solar photvoltaic panel.

In this case, in an embodiment, in the unmanned aerial vehicle 400, each solar photovoltaic panel is designated as one cell and coordinates for each designated cell are set to preset flight path information based on the set corresponding coordinates.

In this case, the coordinates may correspond to location information based on a Global Positioning System (GPS), and accordingly, the unmanned aerial vehicle 400 may determine a current location through the GPS and may move while recognizing a path according to the path information based on the location information and coordinate information and photograph each solar photovoltaic panel through the camera unit.

In this case, according to an embodiment, a member for identifying an identification code for the coordinate recognition may be configured in a frame of each solar photovoltaic panel, and the unmanned aerial vehicle 400 may recognize a code included in the identification member from the monitoring image for the solar photovoltaic panel photographed through the camera unit, extract coordinates corresponding to the code and compare the extracted coordinates with the path according to the path information, and accurately determine the current location on the path through the comparison.

Meanwhile, in an embodiment, the unmanned aerial vehicle 400 analyzes the monitoring image of the solar photovoltaic panel to, when an abnormality occurs, transmit coordinates information and image information for the solar photovoltaic panel to a preset external device (as an embodiment, the monitoring control server 500 and/or the computing device 100), thereby supporting an action for the solar photovoltaic panel in which the abnormality occurs.

Through the configuration, in an embodiment of the present disclosure, the monitoring system may control the unmanned aerial vehicle 400 to fly over the sky of an area (solar photovoltaic power station) where multiple solar photovoltaic panels are located, photograph and correct a image for each solar photovoltaic panel, and determine and provide a malfunctioning area which occurs on the corresponding solar photovoltaic power station based on the corrected image to enhance performance of the solar photovoltaic power station monitoring service and increase efficiency compared with cost for monitoring and management of the solar photovoltaic panel.

FIG. 3 is a configuration diagram for describing an unmanned aerial vehicle 400 according to the embodiment of the present disclosure.

In more detail, referring to FIG. 3, in an embodiment, the unmanned aerial vehicle 400 may include a GPS unit 420, a communication unit 450, a driving unit 440, a storage unit 430, a camera unit 410, and a control unit 460.

In an embodiment, the GPS unit 420 may generate location information for the current location of the unmanned aerial vehicle 400 through GPS communication.

Further, the driving unit 440 drives the unmanned aerial vehicle 400 to allow the unmanned aerial vehicle 400 to operate to fly and move.

Meanwhile, the storage unit 430 may store path information for the path of the unmanned aerial vehicle 400 configured based on coordinate information and location information for coordinates of cells corresponding to each solar photovoltaic panel.

In this case, in an embodiment, the path information may include path information constituted by one or more different location information, and among the location information included in the path information, location information matching the coordinate information corresponding to each solar photovoltaic panel may be set in the path information.

Through this, an order of monitoring for each of the plurality of solar photovoltaic panels may be set in the path information in the order of arrangement of coordinates on the path, and the unmanned aerial vehicle 400 may fly according to the path according to the path information and sequentially monitor each of the solar photovoltaic panels.

Further, the camera unit 410 photographs the solar photovoltaic panel to obtain the monitoring image for the solar photovoltaic panel.

In an embodiment, the camera unit 410 may be implemented to include a real image camera that photographs an image in a real image format, a thermal imaging camera that photographs an image in a thermal image format, and/or a visible light camera that photographs an image in a visible light image format.

Here, the thermal imaging camera according to an embodiment may be a camera that detects heat radiation emitted from an object and visualizes the detected heat radiation in various colors.

In addition, the camera unit 410 may provide a PAN/TILT/ZOOM (PTZ) function.

As a result, the control unit 460 may provide the solar photovoltaic power station monitoring service by controlling each component of the unmanned aerial vehicle 400.

In detail, first, each solar photovoltaic panel according to an embodiment may be configured in a square shape and divided into one cell, and coordinates corresponding to each cell may be preset in the unmanned aerial vehicle 400.

Further, in an embodiment, an identification member including an identification code corresponding to the coordinates may be configured in the frame of each solar photovoltaic panel. In this case, the identification code of the identification member may be constituted by an index number, a bar code, a coordinate symbol, or the like.

Through this, the control unit 460 of the unmanned aerial vehicle 400 may identify the shape of the solar photovoltaic panel based on the monitoring image of the solar photovoltaic panel through the camera unit 410, and identify an area corresponding to the identification member from the shape of the solar photovoltaic panel.

In this case, the control unit 460 may extract an outline of each solar photovoltaic panel through image analysis of the monitoring image, and distinguish different solar photovoltaic panels based on the outline.

In addition, the control unit 460 may recognize the identification code included in the identification member from the area corresponding to the identification member, and generate identification code information for the identification code.

In this case, the storage unit 430 of the unmanned aerial vehicle 400 may store coordinate information corresponding to the identification code information by matching the identification code information, and the control unit 460 compares the identification code information corresponding to the identification code recognized in the monitoring image with the storage unit 430 to extract the coordinate information matching the identification code information By comparing identification code information corresponding to the recognized identification code with the storage unit 430, coordinate information matching the identification code information may be extracted.

Through this, the control unit 460 controls the driving unit 440 to make control the unmanned aerial vehicle fly according to the path information stored in the storage unit 430 based on the location information received through the GPS unit 420 and accurately determine the current location of the unmanned aerial vehicle 400 on the path based on the coordinate information extracted through the monitoring image.

Meanwhile, the control unit 460 of the unmanned aerial vehicle 400 may receive image information about the monitoring image of the solar photovoltaic panel from the camera unit 410 and analyze the image information.

In this case, the image information may be a thermal image, and the control unit 460 may measure a temperature of the solar photovoltaic panel according to analysis of the image information, and when an area where the resulting measurement temperature is equal to or higher than a preset reference value exists in the image information, determine that the abnormality occurs in the corresponding solar photovoltaic panel.

In this case, in an embodiment, the control unit 460 may preset a reference image pattern corresponding to a normal operation of the solar photovoltaic panel and compares the present reference image pattern with an image pattern for the monitoring image provided through the camera unit 410 of the unmanned aerial vehicle 400 to determine whether the solar photovoltaic panel is abnormal.

In addition, when the abnormality occurs in the solar photovoltaic panel, the control unit 460 generates code information for the recognized code from an area corresponding to the identification member of the solar photovoltaic panel where the abnormality occurs through the image information, and generates the coordinate information corresponding to the identification code information from the storage unit 430 to generate monitoring result information including the coordinate information corresponding to the solar photovoltaic panel in which the abnormality occurs.

Further, the unmanned aerial vehicle 400 may be configured with a communication unit 150 for communication with a preset external device (in an embodiment, the monitoring control server 500 and/or the computing device), and the control unit 460 transmits the monitoring result information to the present external device through the communication unit 450 to provide a user located remotely to check whether the abnormality occurs in the solar photovoltaic panel.

Through this, the unmanned aerial vehicle 400 monitors the solar photovoltaic panel while flying according to a preset path, and when an abnormal solar photovoltaic panel is found, the unmanned aerial vehicle 400 immediately notifies the user of the information to the solar photovoltaic panel in which the abnormality occurs to support a rapid action for the solar photovoltaic panel in which the abnormality occurs to be taken.

Meanwhile, the control unit 460 of the unmanned aerial vehicle 400 receives operation information from the external device for starting the unmanned aerial vehicle 400 through the communication unit 450, and controls the driving unit 440 according to the operation information or controls the driving unit 440 at a preset time period according to setting information prestored in the storage unit 430 to make the unmanned aerial vehicle 400 fly and move according to the path information stored in the storage unit 430.

In this case, the control unit 460 may perform controlling of the PTZ function for the camera unit 410 based on the operation information.

Further, the control unit 460 may move the unmanned aerial vehicle 400 from a preset starting point according to the path information, and photographs the monitoring image for each solar photovoltaic panel through the camera unit 410 configured in the unmanned aerial vehicle 400 while flying over the sky of the area where the solar photovoltaic panel is located according to a coordinate order of each solar photovoltaic panel according to the path based on the coordinate information constituting the path include in the path information and generate image information for the photographed monitoring image.

In addition, the control unit 460 may store the image information in the storage unit 430 of the unmanned aerial vehicle 400, and return to a preset docking station preset according to a preset return condition such as a path end according to the path information.

In this case, when the control unit 460 returns to the docking station device, the docking station device and the communication unit 450 may be interconnected, and the control unit 460 may transmit the image information stored in the storage unit 430 to the external device through the docking station device connected to the communication unit 450.

In addition, the docking station device may charge the unmanned aerial vehicle 400 by providing charging power to a power supply unit configured in the unmanned aerial vehicle 400 providing power to each of the components of the unmanned aerial vehicle 400.

Through this, the unmanned aerial vehicle 400 may provide a state of the solar photovoltaic panel so that the user remotely checks the state of the solar photovoltaic panel by photographing an image of the solar photovoltaic panel and transmitting the photographed image to the external device.

Monitoring Control Server 500

The monitoring control server 500 according to an embodiment of the present disclosure may perform a series of processes for providing the solar photovoltaic power station monitoring service.

In detail, the monitoring control server 500 may provide the solar photovoltaic power station monitoring service by exchanging required data with the computing device 100 in order to drive the monitoring application in the computing device 100.

In more detail, in an embodiment, the monitoring control server 500 may provide an environment in which the monitoring application may operate in the computing device 100.

In addition, in an embodiment, the monitoring control server 500 may build a database required for the solar photovoltaic power station monitoring service.

Further, in an embodiment, the monitoring control server 500 may set the flight path of the unmanned aerial vehicle 400 and perform a correction process for the image (in an embodiment, the monitoring image) obtained while the unmanned aerial vehicle 400 autonomously flies according to the set flight path.

In addition, in an embodiment, the monitoring control server 500 may perform a malfunctioning area inspection for the solar photovoltaic power station based on a corrected monitoring image in which a predetermined image processing is performed based on the correction process.

Further, in an embodiment, the monitoring control server 500 may implement and provide the result information of monitoring the solar photovoltaic power station (in an embodiment, the monitoring result image and/or the malfunctioning area result information).

In more detail, referring to FIG. 1 further, the monitoring control server 500 as above may include a monitoring service providing server 510, a database building server 520, a flight path setting server 530, an image correction server 540, a malfunctioning area inspection server 550, and an output image providing server 560.

In this case, in some embodiments, each component may be implemented as a separate device from the monitoring control server 500, or may be implemented by being included in the monitoring control server 500. Hereinafter, it will be described that each component is implemented while being included in the monitoring control server 500, but the present disclosure is not limited thereto.

In more detail, the monitoring service providing server 510 may provide the environment in which the monitoring application may operate in the computing device 100.

That is, the monitoring service providing server 510 may provide the environment in which the monitoring application providing the solar photovoltaic power station monitoring service based on deep learning may be executed operate in the computing device 100.

To this end, the monitoring service providing server 510 may include an application program, data, and/or command for implementing the monitoring application.

In addition, the database building server 520 may store and manage various application programs, applications, commands and/or data for implementing the solar photovoltaic power station monitoring service.

In particular, in an embodiment, the database building server 520 may build a satellite photograph-based database photographed from an artificial satellite.

As an embodiment, the database building server 520 may build a satellite photograph-based database including the solar photovoltaic power station (solar photovoltaic power plant) location (address) information and/or solar photovoltaic panel identification code information in a satellite photograph.

In addition, the database building server 520 may build an aerial photograph (monitoring image)-based database photographed by the unmanned aerial vehicle 400.

In an embodiment, the database building server 520 may build a monitoring image-based database including monitoring images, environmental data, corrected monitoring images, solar photovoltaic panel identification code information in the monitoring image, and/or monitoring result images.

In addition, the database building server 520 may build various algorithm-based database required for the solar photovoltaic power station monitoring service.

In an embodiment, the database building server 520 may build an algorithm-based database including algorithm information, reference value information, and/or computation information.

In addition, the flight path setting server 530 may set the flight path of the unmanned aerial vehicle 400 that photographs the solar photovoltaic power station.

In an embodiment, the flight path setting server 530 may set each of a plurality of solar photovoltaic panels included in the solar photovoltaic power station as one cell, and set the flight path of the unmanned aerial vehicle 400 based on an identification code (e.g., index number and/or coordinate information) mapped to each set cell.

In addition, the image correction server 540 may perform the correction process based on the monitoring image obtained from the unmanned aerial vehicle 400.

In an embodiment, the image correction server 540 may implement an image correction process of performing an affine transformation and/or warping processing process on the monitored image.

Further, the malfunctioning area inspection server 550 may perform a malfunctioning area inspection process for the solar photovoltaic panel included in the solar photovoltaic power station (solar photovoltaic power plant).

In addition, in an embodiment, the malfunctioning area inspection server 550 may perform a detailed cause inspection process for each malfunction type that causes the malfunctioning area of the solar photovoltaic panel.

In this case, the malfunctioning area inspection server 550 may perform the detailed cause inspection process in conjunction with a pre-learned malfunction cause determination image deep-learning neural network in order to determine a detailed cause for each malfunction type for the solar photovoltaic power station.

In an embodiment, the malfunctioning area inspection server 550 may input a malfunctioning may input a monitoring image (as an embodiment, at least any one of the corrected monitoring images) optimized for determining the detailed cause for a first malfunction type into the malfunction cause determination image deep-learning neural network.

In addition, the malfunctioning area inspection server 550 may obtain detailed cause information of the first malfunction type from the malfunction cause determination image deep-learning neural network as output data.

Here, the image deep-learning neural network described above may include at least one deep-learning neutral network of a convolutional neural network (Convolution Neural Network (CNN), e.g., U-net Convolution Neural Network), and Mask R-CNN.

Further, the output image providing server 560 may implement and provide the result information of the solar photovoltaic power station monitoring service as a graphic image.

In an embodiment, the output image providing server 560 may generate the result information of the solar photovoltaic power station monitoring service including the monitoring result image and/or the malfunctioning area result information and provide the result information of the solar photovoltaic power station monitoring service as the graphic image.

Meanwhile, the monitoring control server 500 including the above components may include at least one monitoring service providing server 510, database building server 520, flight path setting server 530, image correction server 540, malfunctioning area inspection server 550, and/or output image providing server 560, and may include processors for data processing and memories storing commands for providing the solar photovoltaic power station monitoring service.

In addition, in an embodiment of the present disclosure, it is described that the monitoring control server 500 provides an environment required for the solar photovoltaic power station monitoring service, builds the database required for the solar photovoltaic power station monitoring service, sets the flight path of the unmanned aerial vehicle 400, performs the correction process for the image (in an embodiment, the monitoring image) obtained by the unmanned aerial vehicle 400 according to the set flight path, performs the malfunctioning area inspection for the solar photovoltaic power station based on the corrected monitoring image for which predetermined image processing is performed based on the performed correction process, and provides the result information (in an embodiment, the monitoring result image and/or the malfunctioning area result information) of monitoring the solar photovoltaic power station, but in some embodiments, various embodiments may be available in that some of the functional operations performed by the monitoring control server 500 may be performed in the computing device 100 and/or the unmanned aerial vehicle 400.

Method for Solar Photovoltaic Power Station Monitoring

Hereinafter, the method in which the solar photovoltaic power station monitoring system (hereinafter, referred to as monitoring system) monitors the solar photovoltaic power station (solar photovoltaic power plant) will be described in detail with reference to FIGS. 4 to 16.

FIG. 4 is a flowchart for describing a method for solar photovoltaic power station according to an embodiment of the present disclosure.

Referring to FIG. 4, the monitoring system according to an embodiment of the present disclosure may build a satellite photograph-based database (S101).

In detail, in an embodiment, the monitoring system may build a database required for the solar photovoltaic power station monitoring service based on the satellite photograph photographed in the artificial satellite.

Here, the artificial satellite according to an embodiment, which is an artificial satellite based on a Global Positioning System (GPS), includes 24 or more artificial satellites which constantly operate at an altitude of 20,000 to 2.5 million kilometers (Km) above the ground, preferably about 20,183 km on average, and each artificial satellite is a global positioning system that broadcasts GPS information signals that may be analyzed by sea level, longitude, latitude and time for free.

In an embodiment, the artificial satellite may transmit the satellite photograph photographed in the corresponding the artificial satellite to the monitoring system.

FIG. 5 illustrates an example of a diagram for describing a method for building a database based on a satellite photograph according to an embodiment of the present disclosure.

In detail, referring to FIG. 5, in an embodiment, the monitoring system may acquire location (address) information for a plurality of solar photovoltaic power stations (solar photovoltaic power plants).

For example, the monitoring system may obtain the location (address) information of at least one solar photovoltaic power station (solar photovoltaic power plant) in conjunction with a plurality of solar photovoltaic power station management servers and/or solar photovoltaic power plant control system servers.

Further, in an embodiment, the monitoring system may search and receive the satellite photograph for an area within a predetermined radius based on the corresponding location information, based on the obtained location information.

That is, the monitoring system may obtain the satellite photograph acquired by photographing the solar photovoltaic power station (solar photovoltaic power plant) corresponding to the obtained location information in the artificial satellite.

In addition, in an embodiment, the monitoring system may detect the solar photovoltaic panel area 10 in the satellite photograph obtained as above.

As an embodiment, the monitoring system performs image analysis for the satellite photograph based on feature information (e.g., color pattern information, shape pattern information, and/or edge (boundary line) information of the solar photovoltaic panel area 10) of the solar photovoltaic panel area 10 implemented by clustering at least one solar panel to detect the solar photovoltaic panel area 10 in the corresponding satellite photograph.

In addition, in an embodiment, the monitoring system may identify at least one individual solar photovoltaic panel (hereinafter, individual panel) within the detected solar photovoltaic panel area 10.

As an embodiment, the monitoring system performs the image analysis the for the satellite photograph to extract an outline for each panel, and classify and detect different individual panels based on the outline.

FIG. 6 illustrates an example of a diagram for describing a method for mapping an identification code for each individual panel in the satellite photograph according to an embodiment of the present disclosure.

Further, referring to FIG. 6, in an embodiment, the monitoring system may map (i.e., label) identification codes for each individual panel classified as above.

Here, the identification code according to an embodiment as information specifying each individual panel in the solar photovoltaic panel area, and may, in an embodiment, include an index number (e.g., 1, 2, 3, . . . ) and/or coordinate information symbol (i.e., a symbol indicating location information in an actual coordinate system for each individual panel, etc.).

For example, the monitoring system may map the identification code for a first individual panel including index number 1 and a coordinate information symbol indicating the location information of the corresponding first individual panel to the first individual panel.

Further, in an embodiment, the monitoring system may build the satellite photograph-based database based on a satellite image on the solar photovoltaic power station monitoring service by converting the satellite photograph to which the identification code for each panel is mapped into a database.

FIG. 7 illustrates an example of a diagram for describing a method for setting an autonomous flight path of an unmanned aerial vehicle 400 according to an embodiment of the present disclosure.

Further, referring to FIG. 7, in an embodiment, the monitoring system may set an autonomous flight path (hereinafter, referred to as a flight path) of the unmanned aerial vehicle 400 that performs photographing while flying over the sky of the area where the plurality of solar photovoltaic panels constituting the solar photovoltaic power station are located.

In detail, the monitoring system may set the flight path for the unmanned aerial vehicle 400 based on the satellite photograph built in the database.

In this case, in an embodiment, the monitoring system may designate each solar photovoltaic panel in the satellite photograph as one cell.

In addition, the monitoring system may preset the flight path of the unmanned aerial vehicle 400 on the corresponding unmanned aerial vehicle 400 based on the identification code (e.g., index number and/or coordinate information symbol) mapped to each cell.

Here, the identification code may correspond to location information based on the Global Positioning System (GPS), and accordingly, the unmanned aerial vehicle 400 may determine a current location through the GPS and may move while recognizing the path according to the path information based on the identification code and photograph each individual panel through the camera unit 410.

FIG. 8 illustrates examples of a diagram for describing a monitoring image according to an embodiment of the present disclosure.

Further, referring to FIG. 8, the monitoring system according to the embodiment may acquire a monitoring image (e.g., aerial photograph) based on the flight path set as described above (S105).

In detail, in an embodiment, the monitoring system may obtain the monitoring image photographed from the unmanned aerial vehicle 400 that autonomously flies based on the set flight path.

Here, the monitoring image according to an embodiment as an image photographed by the unmanned aerial vehicle 400 (e.g., drone) which is flying may be an image acquired by photographing an object on the ground at a position close to the object compared with the satellite photograph.

In an embodiment, the monitoring image may include a real image and a thermal image. In addition, the real image may be matched to generate an orthogonal image for the real-life, and the thermal image may also be matched to generate the orthogonal image for the thermal image.

Here, the real image may be a visible light band image indicating a real shape of an object as an object to be photographed (in an embodiment, the solar photovoltaic power station) as illustrated in FIG. 8A.

Further, the thermal image may be an image photographed by the thermal imaging camera in an infrared band, which detects and visualizes heat radiation emitted from the object to be photographed with various colors as illustrated in FIG. 8B.

The thermal image may be an image that records thermal radiation of an object measured electronically and displays the thermal radiation by a predetermined method (e.g., color display for each thermal radiation value).

In addition, the orthogonal image as an image made like a map of the same scale by correcting the distortion of a photograph occurring according to the height of the ground surface, and in an embodiment, may an image acquired by aligning a plurality of monitoring images acquired by the unmanned aerial vehicle 400 according to a preset coordinate system and matching the aligned monitoring images into one.

In an embodiment, such an orthogonal image may include a real-life orthogonal image generated by matching a plurality of real-life images as illustrated in FIG. 8C-1 and/or a thermal orthogonal image generated by matching a plurality of thermal images as illustrated in FIG. 8C-2.

FIG. 9 illustrates examples of a diagram for describing a panel image according to an embodiment of the present disclosure.

Further, referring to FIG. 9, in this case, the monitoring system may extract a panel image for each individual panel in each image (in an embodiment, real-life image, thermal image, and/or orthogonal image) of the obtained monitoring image.

Here, the panel image according to an embodiment may be an image representing each of at least one individual panel included in the solar photovoltaic panel area 10 of the solar photovoltaic power station.

Referring to FIG. 9A, as an embodiment, the monitoring system may perform image analysis based on the obtained monitoring image and extract outlines for each individual panel in the corresponding monitoring image.

In addition, the monitoring system may classify and detect different individual panels in the monitoring image based on the extracted outline as described above.

For example, the monitoring system performs image analysis for the monitoring image based on feature information (e.g., color pattern information, shape pattern information, and/or edge (boundary line) information of the solar photovoltaic panel area 10) of the solar photovoltaic panel area 10 implemented by a set of at least one individual panel to detect at least one individual panel in the corresponding monitoring image.

In addition, in an embodiment, the monitoring system may obtain panel images 20-1, 20-2, 20-3, 20-4, 20-5, 20-6, . . . for respective individual detected and classified panels.

Referring to FIG. 9B, in another embodiment, in the case of the thermal image of the monitoring image, the monitoring system may convert the corresponding thermal image into a gray scale image.

Further, the monitoring system applies horizontal filtering and vertical filtering based on the converted gray scale image to extract individual panel boundary candidates from pixels having linear characteristics.

In addition, the monitoring system may extract a solar photovoltaic array area image by removing a background area from the corresponding gray scale image.

In addition, the monitoring system may overlap the extracted individual panel boundary candidates and the solar photovoltaic array area image.

Further, the monitoring system may detect the individual panel in the corresponding thermal image by performing morphological image processing for the overlapped image.

In addition, the monitoring system may obtain panel images 20-8, 20-9, 20-10, 20-11, 20-12, 20-13, . . . for each of individual panels based on respective individual detected panels.

Further, in an embodiment, the monitoring system may map (i.e., label) the identification code for each individual panel image obtained as above.

Here, the identification code according to an embodiment as information specifying each individual panel in the solar photovoltaic panel area, and may, in an embodiment, include an index number (e.g., 1, 2, 3, . . . ) and/or coordinate information symbol (i.e., a symbol indicating location information in an actual coordinate system for each individual panel, etc.).

For example, the monitoring system makes index number 1 and a coordinate information symbol indicating the location information of the first individual panel represented by the first panel image be included in the first panel image to map the identification code for the first panel image.

In addition, in an embodiment, the monitoring system may convert the monitoring image to which the identification code for each panel image is mapped into the database and store the corresponding monitoring image.

In an embodiment, the monitoring system may convert the monitoring image including the individual panel image to which the identification code is mapped as described above into the database, and use the corresponding monitoring image when generating the solar photovoltaic power station monitoring result information (monitoring result image, etc.).

As an embodiment, the monitoring system may perform matching between the individual panel area in the satellite image and each panel image in the corrected monitoring image based on the above-described identification code when generating the monitoring result image later. A detailed description thereof will be described below.

Meanwhile, in the embodiment, the monitoring system may further obtain environmental data at the time of the corresponding photographing in addition to the monitoring image including a real-life image, a thermal image, and/or an orthogonal image photographed from the unmanned aerial vehicle 400.

Here, the environmental data according to an embodiment as information on the surrounding environmental conditions at the time when the monitoring image is photographed may include temperature information, humidity information, and/or emissivity information.

In an embodiment, such environmental data is utilized when performing the correction process for the thermal image of the monitoring image later to implement a more precise correction.

Referring back to FIG. 4, the monitoring system that obtains the monitoring image photographed from the unmanned aerial vehicle 400 may obtain the corrected monitoring image by performing the correction process based on the obtained monitoring image (S107).

That is, the monitoring system performs a process of correcting the obtained monitoring image to obtain the corrected monitoring image for which predetermined image processing is performed.

Here, the correction process according to an embodiment may be, when the monitoring image (i.e., the original monitoring image) obtained from the unmanned aerial vehicle 400 does not meet a preset condition (in an embodiment, a reference photographing angle, etc.), a process of converting the corresponding monitoring image to suit the preset condition.

In an embodiment, the correction process may include a monitoring image correction process and a photographing angle correction process.

In detail, in an embodiment, the monitoring system may perform 1) a monitoring image correction process according to a photographing angle error of the unmanned aerial vehicle 400 based on a plurality of real-life images and/or thermal images included in the monitoring image.

In more detail, in an embodiment, the monitoring system may perform a real-time correction process for the corresponding panel image when the photographing error based on the individual panel image in the monitoring image photographed by the unmanned aerial vehicle 400 is detected.

FIG. 10 illustrates an example of a case of calculating a photographing angle of the unmanned aerial vehicle 400 according to an embodiment of the present disclosure.

Specifically, referring to FIG. 10, in an embodiment, the monitoring system may calculate the photographing angle for each of a plurality of panel images included in the real-life image or the thermal image photographed a plurality of times above the first individual panel.

As an embodiment, the monitoring system may perform image analysis for each of the plurality of panel images for the first individual panel, and through this, may extract the outline for each panel image.

Further, in an embodiment, the monitoring system may calculate the photographing angle for the corresponding panel image based on the extracted outline.

For example, the monitoring system may detect outline (edge) information of a panel image obtained by photographing individual panels in a square shape.

In addition, when the detected outline information represents a shape other than a square or rectangular shape, the monitoring system may calculate the photographing angle of the unmanned aerial vehicle 400 based on a predetermined angle formed in the corresponding shape (e.g., an angle other than 90 degrees).

Further, the monitoring system may set a reference shape and a reference size of the panel and calculate the photographing angle based on the error in a reference panel shape and a reference panel size.

Here, the reference panel may mean a reference size and a reference shape determined according to a size and a shape of an actual panel and for converting a panel image that is photographed with the error thereafter.

Further, in an embodiment, the monitoring system may select a main panel image to match the corresponding first individual panel among a plurality of panel images based on the photographing angle calculated for each panel image as described above and a predetermined reference photographing angle (e.g., an angle at the time of photographing the corresponding individual panel on a vertical surface of the individual panel). Here, the main panel image may be an image which becomes a basis of the malfunctioning area inspection.

Here, the reference photographing angle according to an embodiment may be a preset photographing angle of the camera unit 410 of the unmanned aerial vehicle 400 capable of maximizing malfunctioning area detection accuracy based on the panel image.

For example, the reference photographing angle may be a predetermined angle (e.g., an angle when the corresponding individual panel is photographed on the vertical surface of the individual panel) that causes the individual panel in the panel image to be photographed in the form of a reference panel.

The reference photographing angle may be preset on the solar photovoltaic power station monitoring service. For example, the reference photographing angle may be a plane vector direction of the solar photovoltaic panel. Further, the reference photographing angle may be a direction obtained by correcting a position value of the sun with respect to the plane vector direction of the solar photovoltaic panel.

As an embodiment, the monitoring system may select a panel image having a minimum value of an error range between a photographing angle calculated for each panel image and a predetermined reference photographing angle as the main panel image.

FIG. 11 illustrates an example of a case of performing image processing for a panel image when the panel image has a predetermined photographing angle error according to an embodiment of the present disclosure.

In addition, referring to FIG. 11, in an embodiment, the monitoring system may perform image processing on the selected main panel image.

In detail, the monitoring system may perform image processing of converting the main panel image having the predetermined photographing angle error into a reference panel type photographed at the predetermined reference photographing angle.

In detail, depending on the photographing angle of the drone and a photographing position of the drone, the drone may be photographed in a type in which the size or the shape is distorted for each individual panel. When the malfunctioning area is detected for each individual panel, it may be difficult to precisely detect the malfunctioning area and the malfunction cause may not also be accurately determined, and it is difficult to obtain the individual panel image suitable for monitoring.

Thus, for example, when the preset reference photographing angle is '90 degrees' and the calculated photographing angle for the main panel image is '120 degrees', the monitoring system may perform the monitoring image correction process of performing the image processing for the main panel image having a photographing angle error of 30 degrees compared to the reference photographing angle.

In addition, the monitoring system may perform a correction to converting the photographing angle for the main panel image from '120 degrees' to '90 degrees' by performing the image processing.

Through this, the monitoring system may increase accuracy when inspecting the malfunctioning area of the solar photovoltaic panel based on the real-life image and/or the thermal image of the monitoring image later.

More specifically, in an embodiment, the monitoring system may implement the monitoring image correction process by performing an affine transform and/or warping processing process for the selected main panel image.

Here, the affine transform according to an embodiment as a process of converting the plane vector direction of a predetermined image (in an embodiment, the main panel image) may be an image conversion method of implementing a result such as rotating the corresponding image or penetrating a parallelogram in a rectangular shape through an image conversion process in which a straight line is sent as a straight line and the ratio of the distance between points is preserved.

In detail, according to an embodiment, the affine transform may satisfy the following equation.

$$[X^1 \ Y^1 \ 1] = [X \ Y \ 1] \begin{pmatrix} M_{00} & M_{01} & 0 \\ M_{10} & M_{11} & 0 \\ M_{20} & M_{21} & 1 \end{pmatrix} \quad \text{[Equation 1]}$$

In [Equation 1], X is the x coordinate of the main panel image, Y is the y coordinate of the main panel image, and the 3×3 determinant is a matrix constituted by transform coefficients for performing the affine transform.

That is, in an embodiment, the monitoring system may convert the plane vector direction of the main panel image to satisfy the reference photographing angle through [Equation 1] above based on each coordinate value of the main panel image and the affine transform matrix.

For example, the monitoring system may perform an affine transform process of transforming the main panel image in a parallelogram shape into a rectangular shape that satisfies the reference photographing angle.

As described above, in an embodiment, the monitoring system may perform the monitoring image correction process of transforming the corresponding main panel image into a form satisfying the reference photographing angle by performing the affine transform image processing for the main panel image.

Meanwhile, the warping process according to an embodiment may mean an operation of designating at least a partial area within a predetermined image (in an embodiment, the main panel image) and transforming the designated area into a form suitable for a defined reference (in an embodiment, the reference photographing angle).

That is, in an embodiment, the warping process may be a geometric image and/or image processing technique based on a positional movement of a pixel.

In an embodiment, when a main panel image having a predetermined photographing angle error exists, the monitoring system may perform the warping process of moving the position of the pixel in the corresponding main panel image so that the corresponding main panel image is transformed into the form that satisfies the reference photographing angle.

For example, the monitoring system may calculate the photographing angle for the corresponding main panel image based on the coordinate values of both ends of the main panel image, and perform the warping process for the main panel image based on the calculated photographing angle and the reference photographing angle.

Thus, the monitoring system may transform the corresponding main panel image into the form that satisfies the reference photographing angle.

In another example, the monitoring system may perform the warping process based on the main panel image and the reference panel image having the reference photographing angle.

Exemplarily, the monitoring system transforms the form so as to match first to fourth vertices of the main panel image to correspond to first to fourth vertices of the reference photographing angle rectangular image, respectively to obtain the main panel image having the reference photographing angle.

That is, in an embodiment, the monitoring system may perform the correction process for the monitoring image having the photographing angle error by performing image processing (affine transform and/or warping process, etc.) as described above based on the main panel image.

More preferably, the warping process may be preferable in order to accurately indicate the position of each panel for each pixel of each panel. That is, when the size is changed based on each pixel through the warping process, an individual panel image in which the size of each position of the panel is accurately reflected may be obtained.

Here, in an embodiment of the present disclosure, it has been described that the monitoring system transforms the main panel image having the predetermined photographing angle error into a shape suitable for the reference photographing angle based on an affine transform and/or warping process algorithm, but this is only an example and in an embodiment of the present disclosure, the algorithm itself for transforming the corresponding image to satisfy the reference photographing angle is not restricted or limited.

As such, the monitoring system may enhance the accuracy when inspecting the malfunctioning area of the solar photovoltaic panel based on the real-life image and/or the thermal image of the monitoring image later by performing a correction task for the panel image having the photographing angle error in the monitoring image.

FIG. 12 illustrates an example of a case of performing a color correction process for a panel image of a thermal image according to an embodiment of the present disclosure.

In this case, referring to FIG. 12, in an embodiment, when performing the correction process for the monitoring image, when performing image processing based on the panel image for the thermal image of the monitoring image, the monitoring system may perform a color correction process for an individual panel represented by the corresponding thermal panel image according to an error angle from the reference photographing angle.

In detail, in general, in the thermal image panel image, distortion may occur in color information indicating temperature information for at least a partial area on the individual panel represented by the corresponding thermal image panel image according to the error angle from the reference photographing angle.

For example, malfunctioning area 1 (e.g., a hot spot area in which a predetermined object (bird, etc.) exists on the corresponding individual panel and operates abnormally) on the thermal image panel image may be photographed and displayed small or large according to the error angle from the reference photographing angle.

Thus, in an embodiment of the present disclosure, when correcting the thermal image panel image, the color correction process of correcting the size of malfunctioning area 1 on the thermal image panel image according to the corresponding error angle and at the same time, correcting a color displaying the temperature information for malfunctioning area 1 having the corrected size may be performed.

In an embodiment, the monitoring system may adjust the size of malfunctioning area 1 which exists on the corresponding thermal image panel image in proportion to the error angle which is a difference between the photographing angle for the thermal image panel image and the reference photographing angle.

For example, the monitoring system may perform a size correction of expanding malfunctioning area 1 on the thermal image panel image photographed at a photographing angle having a predetermined difference from the reference photographing angle and displayed smaller than an actual image in proportion to the corresponding error angle.

In this case, in an embodiment, as the size of malfunctioning area 1 in the thermal image panel image is corrected as described above, the monitoring system may also correct the color information indicating the temperature information of corresponding malfunctioning area 1.

For example, when the correction of expanding malfunctioning area 1 is performed, the monitoring system may correct extended malfunctioning area 1 to display the same color information as corresponding malfunctioning area 1.

As described above, the monitoring system corrects the size and color information of malfunctioning area 1 present on the thermal image panel image in real time according to the corresponding error angle when correcting and transforming the thermal image panel image to minimize the distortion of the temperature information on the individual panel due to the difference (error angle) between the reference photographing angle and the actual photographing angle.

In addition, according to an embodiment, the monitoring system may perform the color correction process of correcting the color information in the corresponding thermal image panel image based on environmental data (temperature information, humidity information and/or emissivity information, etc.) indicating information on the surrounding environmental conditions at the time of photographing the thermal image panel image.

For example, the monitoring system may perform the color correction process of correcting the color information of the thermal image panel image in proportion to the temperature information of the environmental data.

That is, the monitoring system may further enhance the quality of the monitoring result information for the solar photovoltaic power station by performing the color correction task for the corresponding thermal panel image in consideration of the surrounding environmental conditions when photographing the thermal image.

FIG. 13 illustrates an example of a case of correcting a photographing angle of the unmanned aerial vehicle 400 based on a monitoring image according to an embodiment of the present disclosure.

Meanwhile, in an embodiment, the monitoring system may perform 2) a photographing angle correction process of correcting the photographing angle of the unmanned aerial vehicle 400 based on a plurality of real-life images and/or thermal images included in the monitoring image.

In detail, in an embodiment, the monitoring system may calculate the photographing angle for each of a plurality of panel images included in the real-life image or the thermal image photographed a plurality of times above the first individual panel. For example, the drone may photograph of the first individual panel at least three times while flying from a first position on an upper side of the first individual panel to a third position passing through a second position vertically on the first individual panel.

As an embodiment, the monitoring system may perform image analysis for each of the plurality of panel images for the first individual panel, and through this, may extract the outline for each panel image.

Further, the monitoring system may calculate the photographing angle for the corresponding panel image based on the extracted outline.

In addition, in an embodiment, the monitoring system may determine whether the error angle exists by calculating a difference value between the photographing angle calculated for each panel image and a predetermined reference photographing angle.

In this case, in an embodiment, the monitoring system may perform real-time correction of a camera photographing angle of the unmanned aerial vehicle 400 and/or adjustment of a flight posture based on the corresponding error angle when a predetermined error angle exists.

As an embodiment, the monitoring system may control the camera unit 410 (e.g., a gym ball, etc.) of the corresponding unmanned aerial vehicle 400 based on the calculated error angle and correct the photographing angle for the corresponding panel image in real time through the controlling.

For example, by rotating the camera unit 410 of the unmanned aerial vehicle 400 by the calculated error angle, the monitoring system may correct the photographing angle of the unmanned aerial vehicle 400 with respect to the solar photovoltaic panel.

As another embodiment, the monitoring system controls a body angle of the corresponding unmanned aerial vehicle 400 based on the calculated error angle to correct the photographing angle for the corresponding panel image in real time.

As described above, the monitoring system senses the camera photographing angle of the unmanned aerial vehicle 400 in real time, and if the sensed photographing angle has a predetermined error from the reference photographing angle suitable for monitoring the solar photovoltaic panel, corrects the corresponding photographing angle in real time to perform photographing while quickly recovering the corresponding error even though the photographing angle error occurs while photographing the solar photovoltaic panel and thus further enhance the accuracy of the monitoring image photographed by the unmanned aerial vehicle 400.

In addition, in an embodiment, the monitoring system performs the correction process based on the monitoring image as described above to enhance the accuracy of the malfunctioning area inspection to be performed later and thus increase the reliability of the monitoring result information (in an embodiment, the monitoring result image, etc.) provided to the user.

Subsequently, in an embodiment, the monitoring system performs the above correction process to obtain the corrected monitoring image which is an image transformed by performing predetermined image processing for the monitoring image (an original monitoring image) obtained from the unmanned aerial vehicle 400.

In detail, in an embodiment, the monitoring system may obtain a corrected real-life image and/or a corrected thermal image including the corrected panel image described above.

In addition, the monitoring system may obtain a corrected orthogonal image based on the obtained corrected real-life image and/or the corrected thermal image.

Here, the orthogonal image according to an embodiment is an image made like a map of the same scale by correcting the distortion of a photograph occurring according to the height of the ground surface, and in an embodiment, may an image obtained by aligning a plurality of monitoring images obtained by the unmanned aerial vehicle 400 according to a preset coordinate system and matching the aligned monitoring images into one.

That is, the corrected orthogonal image according to an embodiment may include a corrected real-life orthogonal image generated by matching a plurality of corrected real-life images and/or a corrected thermal image orthogonal image generated by matching a plurality of corrected thermal images.

That is, in an embodiment, the monitoring system may obtain the corrected real-life orthogonal image based on the plurality of corrected real-life images and obtain the corrected thermal image orthogonal image based on the plurality of corrected thermal images.

Referring back to FIG. 4, further, in an embodiment, the monitoring system may perform the malfunctioning area inspection based on the corrected monitoring image obtained as above (S109).

FIG. 14 illustrates an example of a diagram for describing a malfunctioning area inspecting process according to another embodiment of the present disclosure.

In detail, referring to FIG. 14, in an embodiment, the monitoring system may determine whether the malfunctioning area exists in the solar photovoltaic panel of the solar photovoltaic panel module based on the obtained corrected thermal image and/or the corrected thermal image orthogonal image and perform the malfunctioning area inspection for determining a cause type of the corresponding malfunctioning area when the malfunctioning area exists.

Here, the malfunctioning area according to an embodiment is an area determined to operate abnormally in the solar photovoltaic panel, and types that cause the malfunctioning area may include a hot spot malfunction, a bypass diode malfunction, a Potential induced degradation (PID) malfunction, and/or an open and short circuit malfunction type. The malfunction types may be malfunction types which impair the accuracy of information reading based on the thermal image.

More specifically, in an embodiment, the monitoring system may determine the hot spot malfunction type as a case where the malfunctioning area exists in at least a part of individual panels in the corrected thermal image.

In addition, the monitoring system may determine the bypass diode malfunction type as a case where the malfunctioning area exists across a first panel group connected in parallel to a first bypass diode in a panel group including a plurality of individual panels in the thermal image orthogonal image.

In addition, the monitoring system may determine the PID malfunction type as a case where there is a mixture of sporadically irregular hot spot malfunction types and bypass diode malfunction types throughout the panel group in the corrected thermal image orthogonal image.

In addition, the monitoring system may determine the open and short circuit malfunction type as a case where there is a mixture of sporadically irregular hot spot malfunction types and bypass diode malfunction types in the corrected thermal image orthogonal image including an entire panel group included in the solar photovoltaic power station.

Specifically, in an embodiment, the monitoring system may calculate an average temperature of the individual panel within the corresponding image and a temperature deviation of each pixel within the corresponding individual panel based on the corrected thermal image.

That is, in an embodiment, the monitoring system may calculate an average brightness value (average temperature) of each pixel in the individual panel and a standard deviation (temperature deviation) of the average brightness value.

In this case, in an embodiment of the present disclosure, a method for calculating the average temperature and the temperature deviation of the individual panel in the image based on the thermal image may utilize a known algorithm, and in an embodiment of the present disclosure, such a method is not limited or restricted.

In addition, in an embodiment, the monitoring system may compare a value (average temperature and/or standard deviation) calculated based on the brightness value of each pixel in the individual panel as above and a predetermined normal operation reference value.

Here, the normal operation reference value according to an embodiment may be an average brightness value of each pixel in the individual panel within a range in which the solar photovoltaic panel operates normally, and a standard deviation value of the average brightness value.

In addition, in an embodiment, when the calculated value through the above comparison does not satisfy the normal operation reference value, that is, when the calculated value is not included in the value within a normal operation range, the monitoring system may determine that there is the hot spot malfunction exists on the corresponding individual panel.

That is, the monitoring system may determine whether the malfunction area exists in at least a part of the individual panel based on the average temperature and the standard deviation value based on the individual panel in the corrected thermal image and thus determine the presence or absence of the hot spot malfunction type.

In the description of the following embodiments, descriptions overlapping with the above-described contents may be summarized or omitted.

Meanwhile, in an embodiment, the monitoring system may calculate an average temperature of the plurality of individual panels within the corresponding image and a temperature deviation between respective individual panels, based on at least a part of the corrected thermal image orthogonal image.

That is, the monitoring system may calculate an average brightness value (average temperature) of each pixel in the individual panel and a standard deviation (temperature deviation) of the average brightness value.

Further, in an embodiment, the monitoring system may determine whether the calculated value is included in the range in which the solar photovoltaic panel operates normally based on the calculated value (average temperature and/or standard deviation) and a predetermined normal operation reference value.

As an embodiment, the monitoring system compares the calculated value with the normal operation reference value, and when the calculated value does not satisfies the normal operation reference value, the monitoring system may determine that there are the bypass diode malfunction and/or the PID malfunction on at least some individual panels in the corresponding corrected thermal image orthogonal image.

That is, in an embodiment, the monitoring system may determine whether the malfunction area exists throughout the panel group including the plurality of corresponding individual panels based on the average temperature and the standard deviation value based on the plurality of individual panels in the corrected thermal image orthogonal image and thus determine whether there is the bypass diode malfunction and/or the PID malfunction type.

As described above, in an embodiment, the monitoring system performs the malfunction area inspection based on the plurality of individual panels based on the corrected thermal image orthogonal image including at least a part of the solar photovoltaic panel area 10 included in the solar photovoltaic power station to perform the malfunction area inspection for a plurality of solar photovoltaic panels in real time only with a partial area of the solar photovoltaic panel and thus quickly inspect the bypass diode malfunction and/or the PID malfunction for at least a part of the solar photovoltaic power station.

In addition, in an embodiment, the monitoring system may calculate the average temperature for all individual panels of the solar photovoltaic power station and the temperature deviation between all individual respective panels based on the corrected thermal image including the entire corrected thermal image orthogonal image (i.e., the entire solar photovoltaic panel area 10 of the solar photovoltaic power station) (entire panel group).

That is, the monitoring system may calculate an average brightness value (average temperature) of each pixel in all individual panels of the entire corrected thermal image orthogonal image and a standard deviation (temperature deviation) of the average brightness value.

Further, in an embodiment, the monitoring system may determine whether the calculated value is included in the range in which the solar photovoltaic panel operates normally based on the calculated value (average temperature and/or standard deviation) and a predetermined normal operation reference value.

As an embodiment, the monitoring system compares the calculated value with the normal operation reference value, and when the calculated value does not satisfies the normal operation reference value, the monitoring system may determine that there is the open and short circuit malfunction on the solar photovoltaic panel area 10 included in the entire thermal image orthogonal image.

That is, in an embodiment, the monitoring system may obtain the average temperature and the standard deviation values of all corresponding solar photovoltaic panels based on the entire corrected thermal image orthogonal image including all solar photovoltaic panels included in the solar photovoltaic power station and determine whether the malfunction area exists throughout the entire panel group of the solar photovoltaic power station.

In addition, through this, the monitoring system may determine whether the presence or absence of the open and short circuit malfunction type on the corresponding solar photovoltaic power station.

As described above, the monitoring system performs the malfunctioning area inspection based on all individual panels based on the entire corrected thermal image orthogonal image including the entire solar photovoltaic area 10 included in the solar photovoltaic power station to enhance the accuracy and the quality of the malfunctioning area inspection for a large solar photovoltaic power station.

In addition, in an embodiment, the monitoring system performs the malfunctioning area inspection for the solar photovoltaic panel based on the corrected monitoring image (in an embodiment, the corrected thermal image and/or the corrected thermal image orthogonal image) to enhance the reliability of the malfunctioning area inspection result for the solar photovoltaic panel.

In addition, the monitoring system determines and analyzes, and provides various malfunction types for the solar photovoltaic panel based on the corrected monitoring image to further improve the satisfaction and usability of the monitoring service for the solar photovoltaic power station (solar photovoltaic power plant) and allow a user who checks the monitoring result to more deeply and clearly recognize various types of malfunction information which may be generated in the solar photovoltaic panel.

In addition, in an embodiment, when the monitoring system determines that a predetermined malfunction type exists on the solar photovoltaic panel by performing the malfunctioning area inspection as described above, the monitoring system may obtain and provide detailed cause information for the corresponding malfunction type.

In detail, in an embodiment, the monitoring system may perform a detailed cause inspection process in conjunction with a pre-learned malfunction cause determination image deep-learning neural network in order to determine a detailed cause for each malfunction type for the solar photovoltaic power station and provide the determined detailed cause as output data.

More specifically, the monitoring system may determine an inspection image to be input into the malfunction cause determination deep-learning neural network according to the determined malfunction type.

As an embodiment, according to the malfunction type determined through the malfunction area inspection (in an embodiment, a hot spot malfunction, a bypass diode malfunction, a PID malfunction and/or an open and short circuit malfunction type), the monitoring system may select an inspection image suitable for the corresponding malfunction type.

In this case, the monitoring system may determine the inspection image as any one of the corrected real-life image, the corrected thermal image, and/or the corrected orthogonal image of the corresponding corrected monitoring image.

For example, when the monitoring system determines that the hot spot malfunction type exists through the malfunctioning area inspection based on the corrected monitoring image, the monitoring system may generally determine a corrected real-life image (e.g., may easily and accurately determine a state in an actual situation such as a case where a bird sits) which is an image advantageous for cause determination of the hot spot malfunction as the inspection image to be input into the malfunction cause determination deep-learning neural network that determines the detailed cause of the corresponding malfunction type and provides the determined detailed cause as the output data.

In addition, in an embodiment, the monitoring system inputs the inspection image determined as described above into the malfunction cause determination image deep-learning neural network to obtain and provide detailed cause information for the corresponding malfunction type.

As described above, the monitoring system determines the detailed cause of the corresponding malfunction type by performing deep-learning based on an image of a form optimized for the malfunction type to provide more finely analyzed malfunction area inspection information to the user and thus more quickly and accurately perform an appropriate response to the corresponding malfunction.

Referring further to FIG. 4, in addition, in an embodiment, the monitoring system may generate and provide the monitoring result image based on the corrected monitoring image (S111).

Here, the monitoring result image according to an embodiment is an image that displays information about monitoring the solar photovoltaic power station based on the solar photovoltaic power station monitoring service, and in an embodiment, may be an image acquired by combining a satellite photograph acquired by photographing the solar photovoltaic power station from a macroscopic perspective and an aerial photograph acquired by photographing the corresponding solar photovoltaic power station at the level of the unmanned aerial vehicle 400.

In general, in the satellite photograph photographed by the artificial satellite, a situation in which the resolution is deteriorated may occur when the solar photovoltaic panel area 10 is enlarged to a predetermined size in order to accurately check the solar photovoltaic panel area 10.

Thus, in an embodiment of the present disclosure, the solar photovoltaic panel area 10 in the satellite photograph in which the solar photovoltaic power station (solar photovoltaic power plant) may be checked is intended to be provided by being replaced with the corrected monitoring image.

FIG. 15 illustrates an example of a diagram for describing a method for generating a monitoring result image based on a corrected monitoring image according to another embodiment of the present disclosure.

Referring to FIG. 15, in an embodiment, the monitoring system may match and arrange each individual panel image of the corrected monitoring image with each individual panel area in the satellite photograph acquired by photographing the solar photovoltaic power station (solar photovoltaic power plant).

As an embodiment, the monitoring system may match and arrange each panel image of the corrected monitoring image with each individual panel area in the satellite photograph based on the identification code (in an embodiment, the index number and/or coordinate information symbol) mapped to each individual area in the satellite photograph and the identification code (in an embodiment, the index number and/or coordinate information symbol) mapped to each panel image of the corrected monitoring image.

For example, the monitoring system may match and replaceably display a first panel image to which index number '1' in the corrected monitoring image is labeled on the first individual panel area to which index number '1' in the satellite photograph is labeled.

FIG. 16 is a conceptual view for describing the monitoring result image according to an embodiment of the present disclosure.

That is, referring to FIG. 16, in an embodiment, the monitoring system displays each panel image 20 in the corresponding corrected monitoring image on each individual panel area of the solar photovoltaic panel area 10 in the satellite photograph 30 to generate a monitoring result image in which the satellite photograph 30 and at least a part of the corrected monitoring image are combined.

In this case, in an embodiment, the monitoring system may maintain a background area which is an area other than the solar photovoltaic panel area 10 in the satellite photograph 30 when generating the monitoring result image.

That is, the monitoring system performs only the correction for the solar photovoltaic panel area 10 in the satellite photograph 30 and maintains the other background areas, so that the user who checks the monitoring result image may intuitively determine information (position, etc.) on the malfunctioning area which exits at a predetermined position in the corresponding solar photovoltaic panel area 10 based on a surrounding background image of the solar photovoltaic panel area 10 in the corresponding monitoring result image.

In addition, in an embodiment, the monitoring system may generate the monitoring result image in a plurality of modes according to the image type of the corrected monitoring image matching each individual panel area in the satellite photograph 30.

In detail, each panel image 20 in the corrected real-life image is matched and combined with each individual panel area in the satellite photograph 30 which is the real-life image, and as a result, the monitoring system may generate a real-life monitoring result image (first monitoring result image mode) constituted only by the real-life image.

In this case, referring to FIG. 15A, in an embodiment, the monitoring system may generate the real-life monitoring result image by matching and arranging each panel image 20 of the corrected real-life image in each individual panel area in the satellite photograph 30 based on the identification code mapped to each individual panel area in the satellite image 30 and the identification code mapped to each panel image 20 of the corrected real-life image.

Meanwhile, each panel image 20 in the corrected thermal image is matched and combined with each individual panel area in the satellite photograph 30 which is the real-life image, and as a result, the monitoring system may generate a thermal image monitoring result image (second monitoring result image mode) implemented by mixing the real-life image and the thermal image.

In this case, referring to FIG. 15B, in an embodiment, the monitoring system may obtain the terminal image monitoring result image by matching and arranging each panel image 20 of the corrected thermal image in each individual panel area in the satellite photograph 30 based on the identification code mapped to each individual panel area in the satellite image 30 and the identification code mapped to each panel image 20 of the corrected thermal image.

That is, in an embodiment, the monitoring system may generate the monitoring result image including a real-life monitoring image (first monitoring result image mode) in which the solar photovoltaic panel area 10 in the satellite photograph 30 is replaced with the panel image 20 in the corrected real-life image and/or a thermal image monitoring result image (second monitoring result image mode) in which the solar photovoltaic panel area 10 in the satellite photograph 30 is replaced with the panel image 20 in the corrected thermal image.

Further, in an embodiment, the monitoring system may make an original monitoring result image (third monitoring result image mode) providing the existing image without correcting the solar photovoltaic panel area 10 in the satellite photograph 30 be included in the monitoring result image.

In addition, in an embodiment, the monitoring system may output the monitoring result image generated as such as the graphic image and provide the graphic image to the user.

As described above, in an embodiment, the monitoring system replaces and provides the solar photovoltaic panel area 10 of the satellite photograph 30 based on the panel image 20 in the corrected real-life image or the corrected thermal image to macroscopically check the solar photovoltaic power station (solar photovoltaic power plant) and check the solar photovoltaic panel area 10 in the corresponding satellite photograph 30 with higher resolution and accuracy.

In this case, in an embodiment, the monitoring system may output monitoring result images generated in a plurality of modes in various methods according to user selection.

In detail, as an embodiment, the monitoring system may output and provide an image in one mode determined by a user setting and/or preset autonomous process among first to third monitoring result image modes.

In addition, the monitoring system may convert and provide the provided mage in one mode into an image in the other mode other than the one mode according to user input.

In detail, in an embodiment, the monitoring system may provide a mode setting user interface capable of selecting a mode of a monitoring result image to be output.

Further, the monitoring system may convert the provided monitoring result image into a monitoring result image in the other mode and output the monitoring result image based on a user input for the provided mode setting user interface.

For example, the monitoring system may first provide a real-life monitoring result image which is a 'first mode' according to user setting and then, when the user input for the mode setting user interface then selects a 'second mode', the monitoring system may switch the provided real-life monitoring result image (first mode) into a thermal image monitoring result image which is a second mode.

Further, in another embodiment, the monitoring system may simultaneously display and provide the first to third monitoring result images in a lump.

For example, the monitoring system may simultaneously output and provide the first to third monitoring result image modes to the user in a lump.

As described above, in an embodiment, the monitoring system allows the monitoring result image in other mode to be checked in various methods depending on the user selection to provide a monitoring result image in a form optimized to the user's request and thus enhance the usability and convenience.

FIG. 17 illustrates an example of a case providing malfunctioning area inspecting result information based on the monitoring result image.

In addition, referring to FIG. 17, in an embodiment, when providing the monitoring result image as described above, the monitoring system may display and provide malfunctioning area inspection result information together.

In detail, the monitoring system may provide the malfunctioning area inspection result information including presence or absence, location, shape, type, and/or detailed cause of the malfunctioning area in the solar photovoltaic panel.

As an embodiment, the monitoring system may provide, on the monitoring result image, the malfunctioning area inspection result information obtained through the real-time malfunctioning area inspection process for the solar photovoltaic panel in the corresponding image, based on a separate alarm indication (e.g., a predetermined symbol and/or a notification window, etc.).

For example, the monitoring system may display and provide an alarm symbol 40 that highlights the location of the malfunctioning area together on the output monitoring result image.

Alternatively, in an embodiment, the monitoring system may provide the corresponding malfunctioning area inspection result information based on a malfunctioning area inspection result display interface 50.

As an embodiment, the monitoring system may provide the malfunctioning area inspection result display interface 50 together when providing the monitoring result image.

In addition, the monitoring system may output the real-time failure area inspection result information related to the solar photovoltaic panel in the corresponding monitoring result image and provide the output real-time malfunctioning area inspection result information to the user based on the provided malfunctioning area inspection result display interface 50.

As described above, in an embodiment, the monitoring system provides the monitoring result image further including the malfunctioning area inspection result information obtained in real time to monitor and manage whether the solar photovoltaic power station (solar photovoltaic power plant) normally operates in real time.

Hereinabove, in the solar photovoltaic power station monitoring method and system according to an embodiment of the present disclosure, by performing a correction process for a monitoring image obtained from the unmanned aerial vehicle 400 that photographs the solar photovoltaic power station, accuracy of inspection of the malfunctioning area of the solar panel based a real image and/or a thermal image of the corresponding monitoring image can be enhanced.

Further, in the solar photovoltaic power station monitoring method and system according to an embodiment of the present disclosure, the malfunctioning area which occurs on the corresponding solar photovoltaic power station is determined and provided based on the corrected monitoring image to more accurately obtain information on the malfunctioning area and enhance reliability and quality of monitoring result information (in the embodiment, the monitoring result image, etc.) provided to the user.

In addition, the solar photovoltaic power station monitoring method and system according to an embodiment of the present disclosure provide the monitoring result information generated with higher accuracy based on the corrected monitoring image to increase the performance of the solar photovoltaic power station monitoring service and allows the user who checks the monitoring result to check higher accurate malfunction information to quickly perform the appropriate response thereto.

In addition, the solar photovoltaic power station monitoring method and system according to an embodiment of the present disclosure provide a monitoring result image in which the satellite photograph 30 acquired by photographing the solar photovoltaic power station from the macroscopic perspective and the aerial vehicle acquired by photographing the corresponding solar photovoltaic power station at the level of the unmanned aerial vehicle 400 are combined to check the large solar photovoltaic power station at a macroscopic perspective level and provide the image of the solar photovoltaic panel area 10 having higher resolution and accuracy.

Further, the solar photovoltaic power station monitoring method and system according to an embodiment of the present disclosure provide a monitoring result image replacing the solar photovoltaic panel area 10 in the satellite photograph 30 based on the panel image 20 in the corrected aerial photograph, so as to intuitively determine information (position, etc.) on the malfunctioning area which exits at a predetermined position in the corresponding solar photovoltaic panel area 10 based on the surrounding background image of the solar photovoltaic panel area 10 in the corresponding monitoring result image.

Further, the solar photovoltaic power station monitoring method and system according to an embodiment of the present disclosure provide an analysis for each malfunction type which may occur in the solar photovoltaic power station by performing the deep-learning based on the corrected image to provide more finely analyzed malfunction area inspection information to the user and thus more quickly and accurately perform the appropriate response to the corresponding malfunction.

Further, the embodiments according to the present disclosure described above may be implemented in a form of a program command which may be executed through various computer components means and recorded in the computer readable recording medium. The computer readable recording medium may include singly a program command, a data file, or a data structure or a combination thereof. The program command recorded in the computer readable recording medium may be specially designed and configured for the present disclosure, or may be publicly known to and used by those skilled in the computer software field. Examples of the computer readable recording media may include a hardware device particularly configured to store and execute program commands, magnetic media such as hard disks, floppy disks, and magnetic tape, optical recording media such as CD-ROM disks and DVD, magneto-optical media such as floptical disks, ROM, RAM, and flash memories. Examples of the program commands include a high-level language code executable by a computer by using an interpreter, and the like, as well as a machine language code created by a compiler. The hardware devices may be changed to one or more software modules in order to perform the processing according to the present disclosure, and an opposite situation thereof is available.

The present disclosure as a method for monitoring a solar photovoltaic power station with a drone has an industrial applicability.

In the solar photovoltaic power station monitoring method and system according to an embodiment of the present disclosure, by performing a correction process for a monitoring image obtained from the unmanned aerial vehicle that photographs the solar photovoltaic power station, accuracy of inspection of the malfunctioning area of the solar photvoltaic panel based a real image and/or a thermal image of the corresponding monitoring image can be enhanced.

Further, in the solar photovoltaic power station monitoring method and system according to an embodiment of the present disclosure, the malfunctioning area which occurs on the corresponding solar photovoltaic power station is determined and provided based on the corrected monitoring image to more accurately obtain information on the malfunctioning area and enhance reliability and quality of monitoring result information (in the embodiment, the monitoring result image, etc.) provided to the user.

What is claimed is:

1. A method of monitoring solar photovoltaic power station by a monitoring system, the monitoring system includes an unmanned aerial vehicle flying over a plurality of solar photovoltaic panels included in a solar photovoltaic power station and obtaining and providing a monitoring image by photographing the solar photovoltaic panel, a monitoring control server correcting the monitoring image and obtaining the corrected monitoring image, and a computing device executing a solar photovoltaic power station monitoring application of performing a malfunction area inspection process for the solar photovoltaic panel based on the obtained corrected monitoring image, the method comprises:
a) building a satellite photograph-based database,
wherein the step of building the satellite photograph-based database comprises:
obtaining a satellite photograph of the solar photovoltaic power station from an artificial satellite,
detecting a solar photovoltaic panel area from the obtained satellite photograph,
identifying at least one individual panel area and a first identification code of each identified individual panel area from the detected solar photovoltaic panel area, and
mapping the first identification code specifying a location of each identified individual panel area to build the satellite photograph-based database;
b) determining an autonomous flight path of the unmanned aerial vehicle according to the mapped first identification code and setting the determined autonomous flight path in the unmanned aerial vehicle;
c) obtaining the monitoring image photographed by the unmanned aerial vehicle while the unmanned aerial vehicle is flying over the solar photovoltaic panel along the set autonomous flight path and sending the obtained monitoring image to the monitoring control server,
wherein,
the monitoring image includes a real-life image, a thermal image, and an orthogonal image, and
environmental data on surrounding environmental conditions are obtained when the monitoring image is photographed, wherein the environmental data include temperature information, humidity information, and/or emissivity information;
d) performing a process of correcting the obtained monitoring image to obtain the corrected monitoring image for which predetermined image processing is performed in the monitoring control server,
wherein,
the process of correcting the obtained monitoring image is performed through Affine Transform and/or Warping for a selected panel image, and
the corrected monitoring image includes a corrected real-life image, a corrected thermal image, and a corrected orthogonal image;
e) determining whether a malfunctioning area exists in the solar photovoltaic panel based on the corrected monitoring image;
f) performing the malfunctioning area inspection to determine a cause type of the corresponding malfunctioning area when the malfunctioning area exists based on the corrected monitoring image,
wherein the malfunctioning area inspection is performed by linking with a pre-trained fault cause determination image deep-learning neural network to determine a detailed cause of the cause type; and
g) generating and displaying a monitoring result image including the corrected monitoring image and the malfunctioning area,
wherein,
the orthogonal image includes a real-life orthogonal image generated based on a plurality of real-life images and a thermal orthogonal image generated based on a plurality of thermal images,
the step of performing a process of correcting the obtained monitoring image includes, calculating a photographing angle for the monitoring image, and
when the calculated photographing angle has a predetermined error angle or more from a present reference photographing angle, performing a correction process based on the monitoring image, and
the step of performing the malfunctioning area inspection comprises,
calculating an average temperature of an individual panel of the plurality of solar photovoltaic panels within the corrected thermal image and a temperature deviation of each pixel within the individual panel based on the corrected thermal image;
comparing each of the average temperature and the temperature deviation with a predetermined normal operation reference value; and
determining that a hot spot malfunction exists on the individual panel when the calculated average temperature and the temperature deviation are not included in values within a normal operation range.

2. The method of claim 1,
wherein the step of performing a process of correcting the obtained monitoring image comprises:
obtaining a panel image which is an image representing at least one individual panel in the monitoring image based on the monitoring image, and
labeling a second identification code specifying the individual panel to the obtained panel image.

3. The method of claim 2,
wherein the correction process includes at least one of a monitoring image correction process of performing conversion for the monitoring image and a photographing angle correction process of changing the photographing angle by controlling a camera unit photographing the monitoring image.

4. The method of claim 3,
wherein the step of performing a process of correcting the obtained monitoring image comprises:
calculating the photographing angle for each of a plurality of panel images included in the monitoring image photographed a plurality of times at an upper side of a first individual panel,
comparing the calculated photographing angle and the reference photographing angle and selecting one panel image having a minimum mutual error range value as a main panel image,
converting the main panel image so as to satisfy the reference photographing angle by performing image processing based on the selected main panel image, and
determining the converted main panel image as the panel image of the first individual panel.

5. The method of claim 4,
wherein the step of performing a correction process based on the monitoring image comprises:
calculating an error angle which is a difference value between the photographing angle for the monitoring image and the reference photographing angle and
adjusting a size of a malfunctioning area in the thermal image based on the calculated error angle at the time of performing the monitoring image correction process for the thermal image.

6. The method of claim 5, wherein the step of performing a process of correcting the obtained monitoring image comprises:
calculating the error angle which is the difference value between the photographing angle for the monitoring image and the reference photographing angle and performing a color correction process for the panel image based on the calculated error angle at the time of performing the monitoring image correction process for the thermal image and the environmental data corresponding to the monitoring image.

* * * * *